(12) United States Patent
Palin et al.

(10) Patent No.: US 10,004,079 B2
(45) Date of Patent: Jun. 19, 2018

(54) METHOD, APPARATUS, AND COMPUTER PROGRAM PRODUCT FOR WIRELESS SHORT-RANGE COMMUNICATION CHANNEL SELECTION

(71) Applicant: Nokia Technologies Oy, Espoo (FI)

(72) Inventors: Arto Palin, Viiala (FI); Jukka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 15/051,178

(22) Filed: Feb. 23, 2016

(65) Prior Publication Data

US 2017/0245285 A1 Aug. 24, 2017

(51) Int. Cl.
| | | |
|---|---|---|
| H04W 4/00 | (2018.01) | |
| H04W 72/08 | (2009.01) | |
| H04L 12/751 | (2013.01) | |
| H04W 8/00 | (2009.01) | |
| H04W 28/02 | (2009.01) | |
| H04L 29/08 | (2006.01) | |

(Continued)

(52) U.S. Cl.
CPC ........... *H04W 72/082* (2013.01); *H04L 45/02* (2013.01); *H04W 4/008* (2013.01); *H04W 4/80* (2018.02); *H04W 8/005* (2013.01); *H04W 28/0236* (2013.01); *H04B 5/00* (2013.01); *H04L 67/04* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,712,330 | B2 | 4/2014 | Desai et al. |
| 8,874,034 | B2 | 10/2014 | Walley et al. |
| 9,158,395 | B2 | 10/2015 | Park et al. |

(Continued)

FOREIGN PATENT DOCUMENTS

| | | |
|---|---|---|
| EP | 1187504 | 3/2002 |
| EP | 2015274 | 1/2009 |

(Continued)

OTHER PUBLICATIONS

Chapter 2, "Air Interface Packets", Link Layer Specification, Core System Package [Low Energy Controller volume], Bluetooth Specification, Version 4.1 [vol. 6], p. 37 to 128 of 174.

(Continued)

*Primary Examiner* — Bob Phunkulh
(74) *Attorney, Agent, or Firm* — Locke Lord LLP

(57) ABSTRACT

An example embodiment enables wireless devices to adapt their channel maps when initiating connection to avoid interference, comprising receiving, by an apparatus, wireless device discovery messages from one or more other wireless devices in wireless networks not connected to the apparatus, one or more of the received wireless discovery messages including channel information indicating status of one or more channels; creating, by the apparatus, a channel map that is at least partly based on the status of the one more channels indicated in the received one or more wireless device discovery messages; and selecting, by the apparatus, channels for setting up wireless communication with another wireless device, the channels being selected at least partly based on the channel map created by the apparatus.

21 Claims, 13 Drawing Sheets

(51) Int. Cl.
*H04W 84/18* (2009.01)
*H04B 5/00* (2006.01)

(56) References Cited

U.S. PATENT DOCUMENTS

| | | | |
|---|---|---|---|
| 9,813,189 B2* | 11/2017 | Chou | H04L 1/0005 |
| 2004/0042413 A1 | 3/2004 | Kawamura et al. | |
| 2004/0215816 A1 | 10/2004 | Hayes et al. | |
| 2005/0278646 A1 | 12/2005 | Liscano et al. | |
| 2006/0240777 A1 | 10/2006 | Ruuska | |
| 2006/0267794 A1 | 11/2006 | Lee et al. | |
| 2007/0206660 A1 | 9/2007 | Lifchuk | |
| 2007/0253386 A1* | 11/2007 | Li | H04L 1/0026 370/338 |
| 2007/0259671 A1* | 11/2007 | Cheng | H04L 1/0026 455/452.2 |
| 2007/0263551 A1 | 11/2007 | Birchler et al. | |
| 2008/0013502 A1 | 1/2008 | Clark | |
| 2008/0161026 A1 | 7/2008 | Wiatrowski et al. | |
| 2009/0320098 A1 | 12/2009 | Roberts et al. | |
| 2010/0105409 A1 | 4/2010 | Agarwal et al. | |
| 2010/0106797 A1* | 4/2010 | Nagaraja | H04B 7/026 709/217 |
| 2010/0118736 A1 | 5/2010 | Chung et al. | |
| 2010/0183049 A1* | 7/2010 | Brandt | H04M 1/6066 375/134 |
| 2010/0291952 A1 | 11/2010 | Gosset et al. | |
| 2011/0066850 A1 | 3/2011 | Ekberg | |
| 2011/0103428 A1 | 5/2011 | Chan | |
| 2011/0128881 A1* | 6/2011 | Zhai | H04B 17/309 370/252 |
| 2011/0281519 A1 | 11/2011 | Reuss et al. | |
| 2011/0319020 A1 | 12/2011 | Desai et al. | |
| 2012/0052802 A1 | 3/2012 | Kasslin et al. | |
| 2012/0196534 A1* | 8/2012 | Kasslin | H04W 4/06 455/41.2 |
| 2013/0065584 A1 | 3/2013 | Lyon et al. | |
| 2013/0138786 A1 | 5/2013 | Ji et al. | |
| 2013/0165044 A1 | 6/2013 | Xie et al. | |
| 2013/0178160 A1 | 7/2013 | Wang | |
| 2013/0210353 A1* | 8/2013 | Ling | H04W 4/008 455/41.1 |
| 2014/0018002 A1 | 1/2014 | Jose et al. | |
| 2014/0073244 A1 | 3/2014 | Ko et al. | |
| 2014/0112194 A1* | 4/2014 | Novlan | H04W 8/005 370/254 |
| 2014/0188348 A1* | 7/2014 | Gautama | B60W 10/30 701/48 |
| 2014/0380159 A1 | 12/2014 | Reilly et al. | |
| 2015/0135087 A1 | 5/2015 | Verkasalo | |
| 2015/0193198 A1 | 7/2015 | Hutchings et al. | |
| 2015/0256954 A1 | 9/2015 | Carlsson et al. | |
| 2015/0289081 A1* | 10/2015 | Chen | H04W 8/005 455/41.2 |
| 2015/0304209 A1 | 10/2015 | Choudhury et al. | |
| 2015/0327138 A1* | 11/2015 | Lee | H04W 76/064 455/426.1 |
| 2015/0327180 A1* | 11/2015 | Ryu | H04L 1/00 370/329 |
| 2015/0341876 A1 | 11/2015 | Abraham et al. | |
| 2015/0373083 A1 | 12/2015 | Geurts et al. | |
| 2016/0072573 A1 | 3/2016 | Tohzaka et al. | |
| 2016/0105761 A1* | 4/2016 | Polo | H04W 4/008 455/41.2 |
| 2016/0119859 A1* | 4/2016 | Liu | H04W 48/10 370/311 |
| 2016/0157163 A1* | 6/2016 | Lee | H04W 48/08 370/338 |
| 2016/0174021 A1* | 6/2016 | Lim | H04W 4/008 370/310 |
| 2016/0323922 A1* | 11/2016 | Park | H04W 24/10 |
| 2016/0374123 A1* | 12/2016 | Arvidson | H04W 8/005 |
| 2017/0006538 A1* | 1/2017 | Liu | H04W 48/20 |
| 2017/0078030 A1* | 3/2017 | Olgaard | H04B 17/17 |
| 2017/0078031 A1* | 3/2017 | Olgaard | H04B 17/17 |
| 2017/0078032 A1* | 3/2017 | Olgaard | H04B 17/17 |
| 2017/0099689 A1* | 4/2017 | Kalhan | H04W 76/023 |
| 2017/0127262 A1* | 5/2017 | Hu | H02M 5/297 |
| 2017/0134294 A1* | 5/2017 | Li | H04L 47/25 |
| 2017/0201931 A1* | 7/2017 | Swanzey | H04W 48/10 |
| 2017/0215113 A1* | 7/2017 | Lee | H04W 36/0066 |
| 2017/0223579 A1* | 8/2017 | Lee | H04W 28/16 |
| 2017/0245204 A1* | 8/2017 | Kumar | H04W 48/16 |

FOREIGN PATENT DOCUMENTS

| | | |
|---|---|---|
| EP | 1418781 | 6/2012 |
| KR | 20110032370 | 3/2011 |
| WO | WO2005091573 | 9/2005 |

OTHER PUBLICATIONS

Channel Classification and Channel Map Selection, Bluetooth Specification Version 4.2 [vol. 2, Part B], Baseband Specification, Sec. 8.6.8, pp. 188-189, Dec. 2, 2014.

Channel Classification, Bluetooth Specification Version 4.2 [vol. 2, Part C], Link Manager Protocol Specification, Sec. 4.1.5, pp. 258-259, Dec. 2, 2014.

Data Channel Index Selection, Bluetooth Specification Version 4.2 [vol. 6, Part B], Link Layer Specification, Sec. 4.5.8, pp. 82-83, Dec. 2, 2014.

Channel Map Update Procedure, Bluetooth Specification Version 4.2 [vol. 6, Part] Link Layer Specification, Sec 5.1.2, pp. 94-95, Dec. 2, 2014.

Channel Map Update, Bluetooth Specification Version 4.2 [vol. 6, Part D], Message Sequence Charts, Sec. 6.3, p. 149, Dec. 2, 2015.

"Bluetooth Specification version 4.2", Bluetooth SIG, Dec. 2, 2014 (Dec. 2, 2014), XP055359393, Retrieved from the Interernet: URL:https:// www.bluetooth.com/specificatio.ns/adopted-specifications [retrieved on Mar. 28, 2017].

Greg Stewart: "Can BLE advertise while being connected ?", TI E2E Community—Bluetooth low energy Forum, Nov. 20, 2014 (Nov. 20, 2014), XP002769355, Retrieved from the Internet: URL:https://e2e.ti.com/support/wireless_connectivity/bluetooth_low_energy/f/538/t/383746 [retrieved on Apr. 19, 2017].

European Search Report completed Apr. 24, 2017 for Application No. EP 17 15 4094.

* cited by examiner

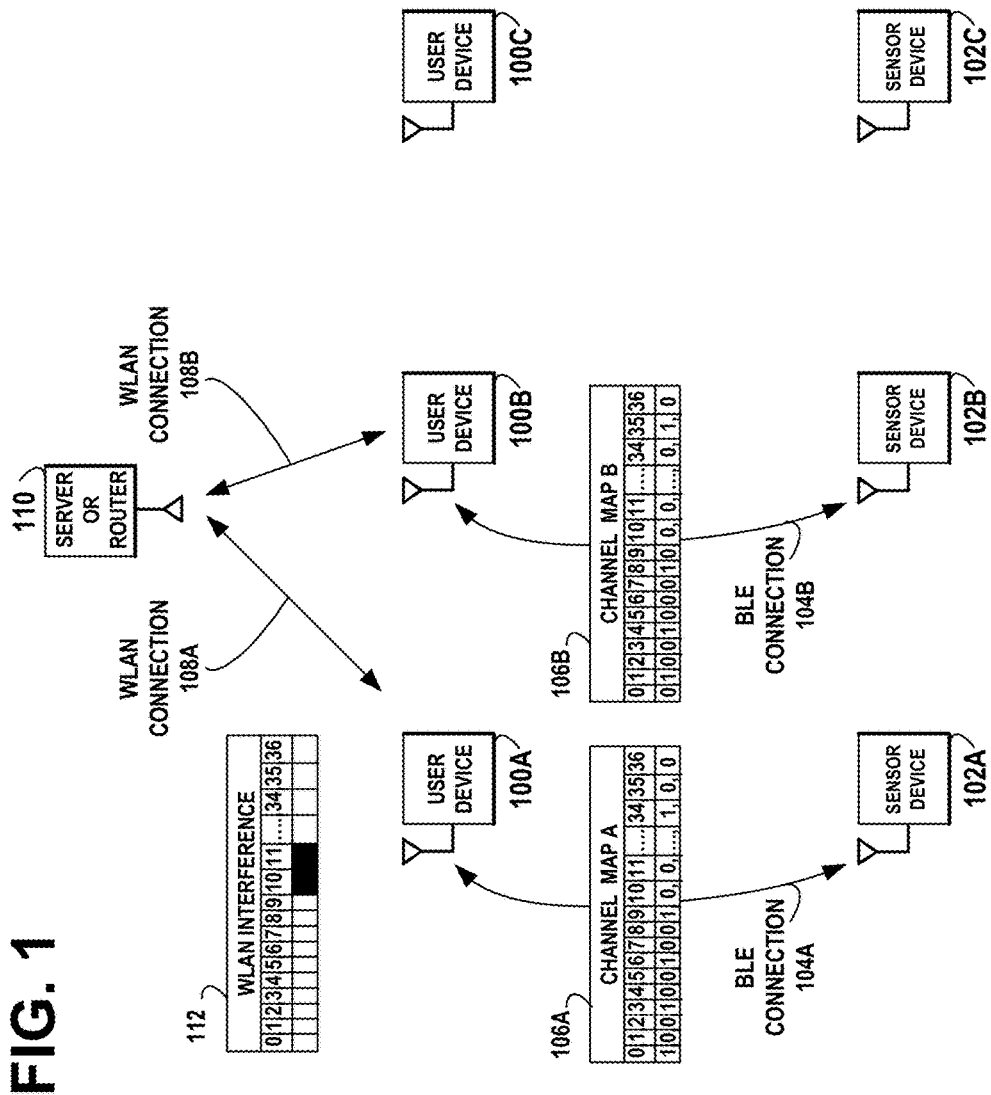

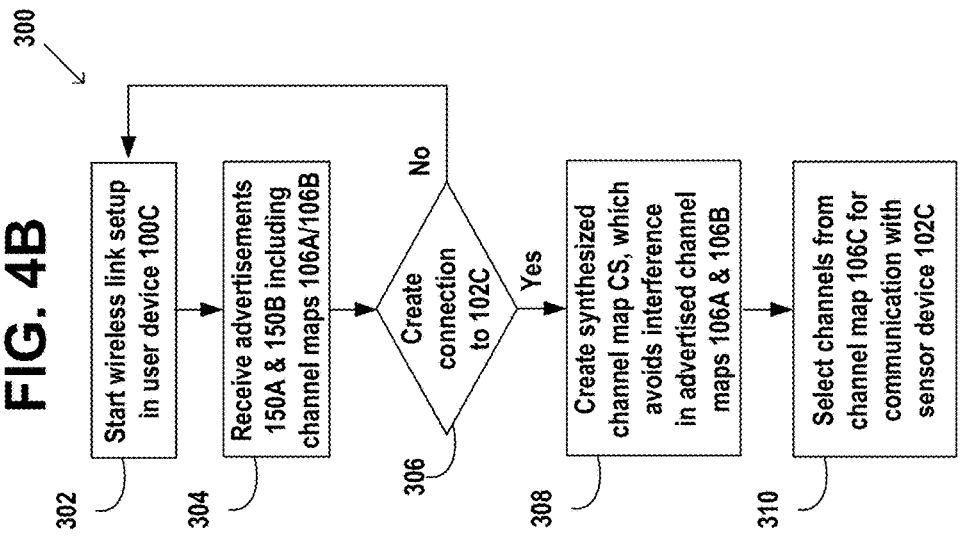
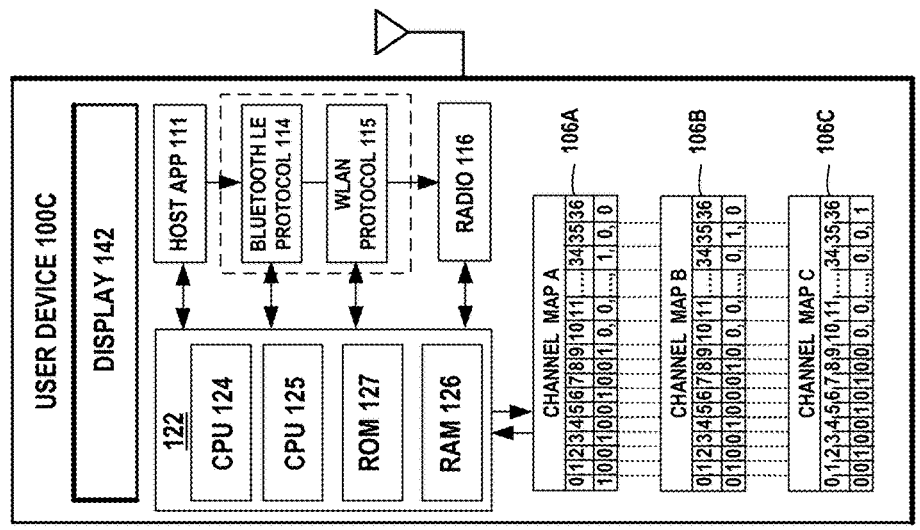

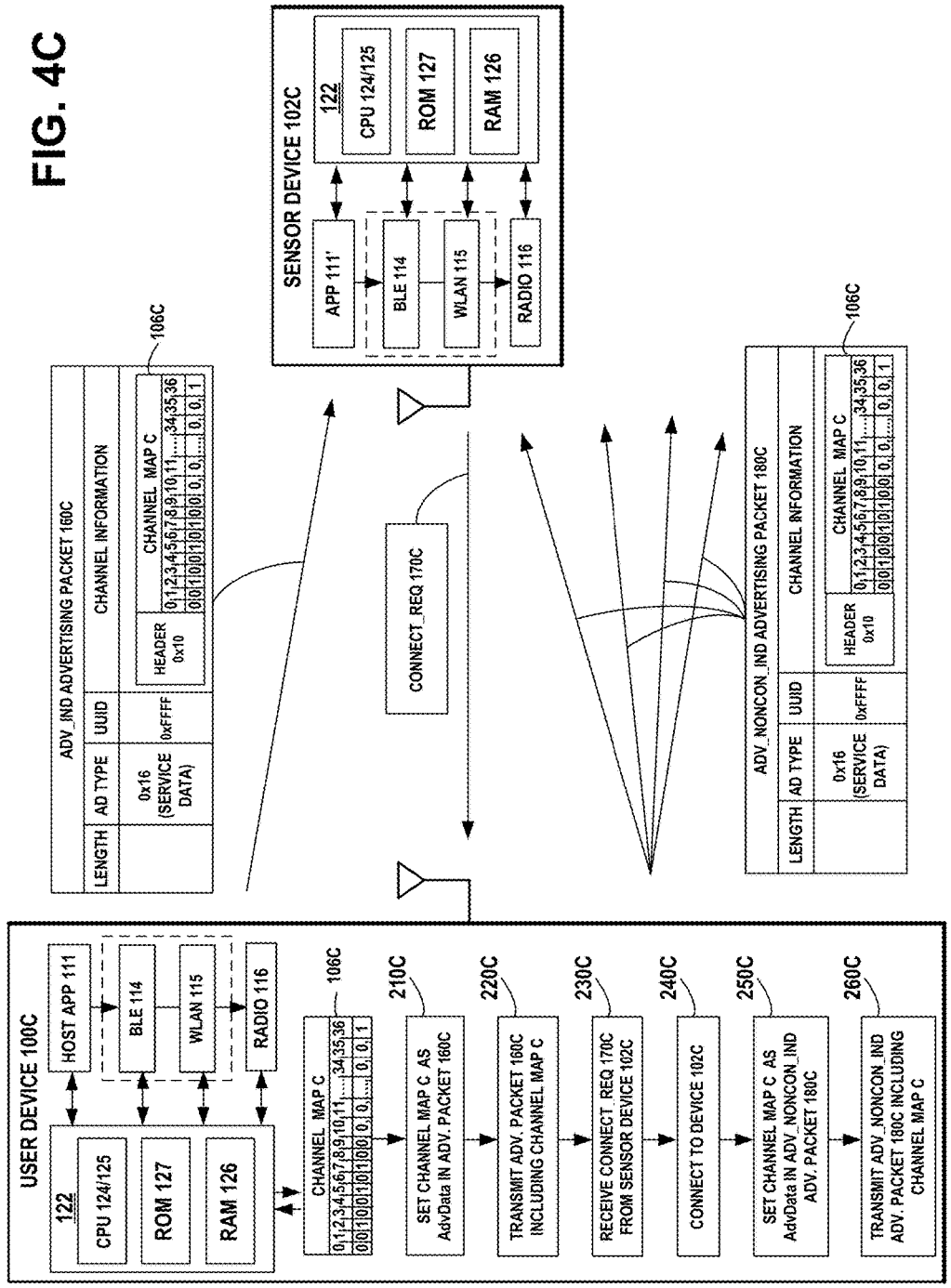

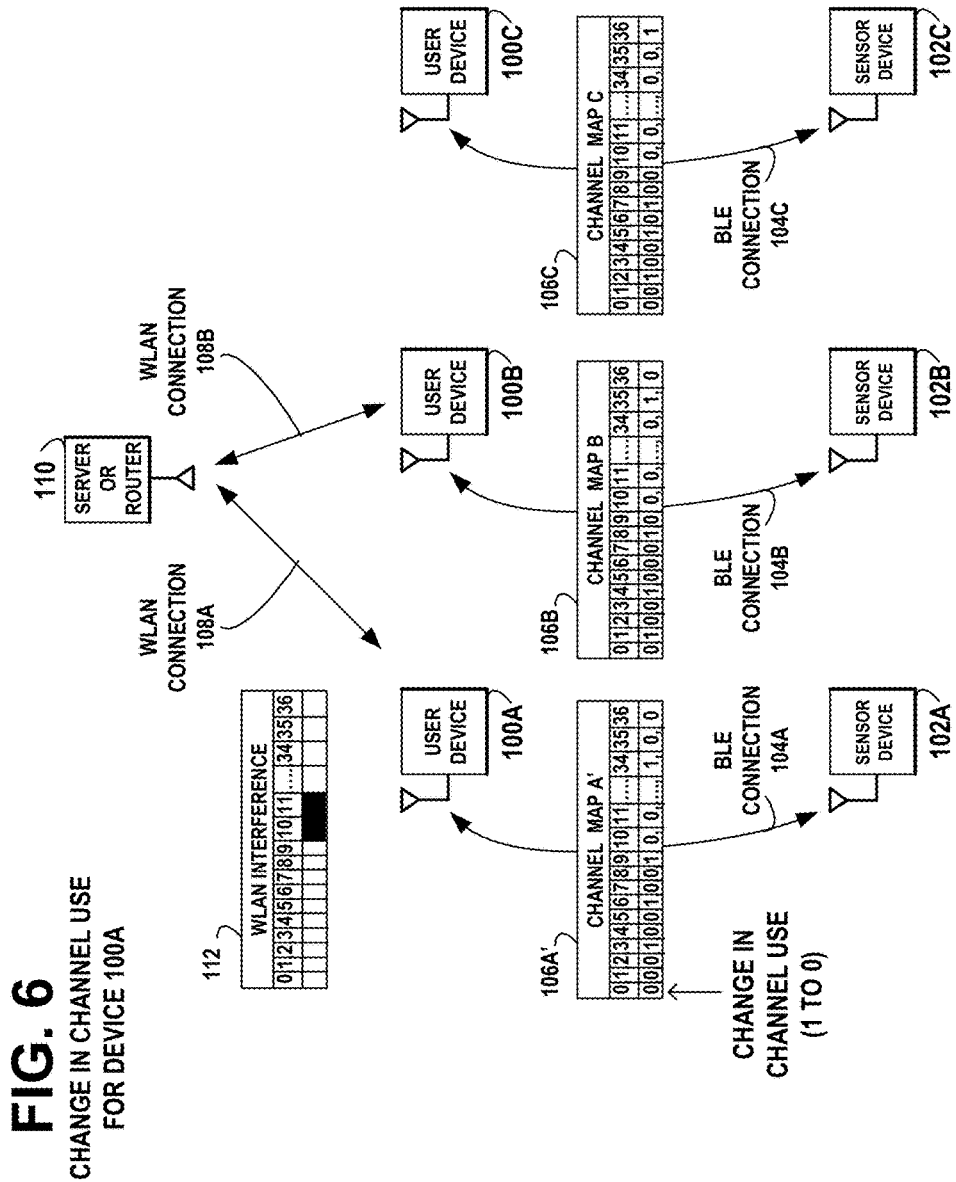

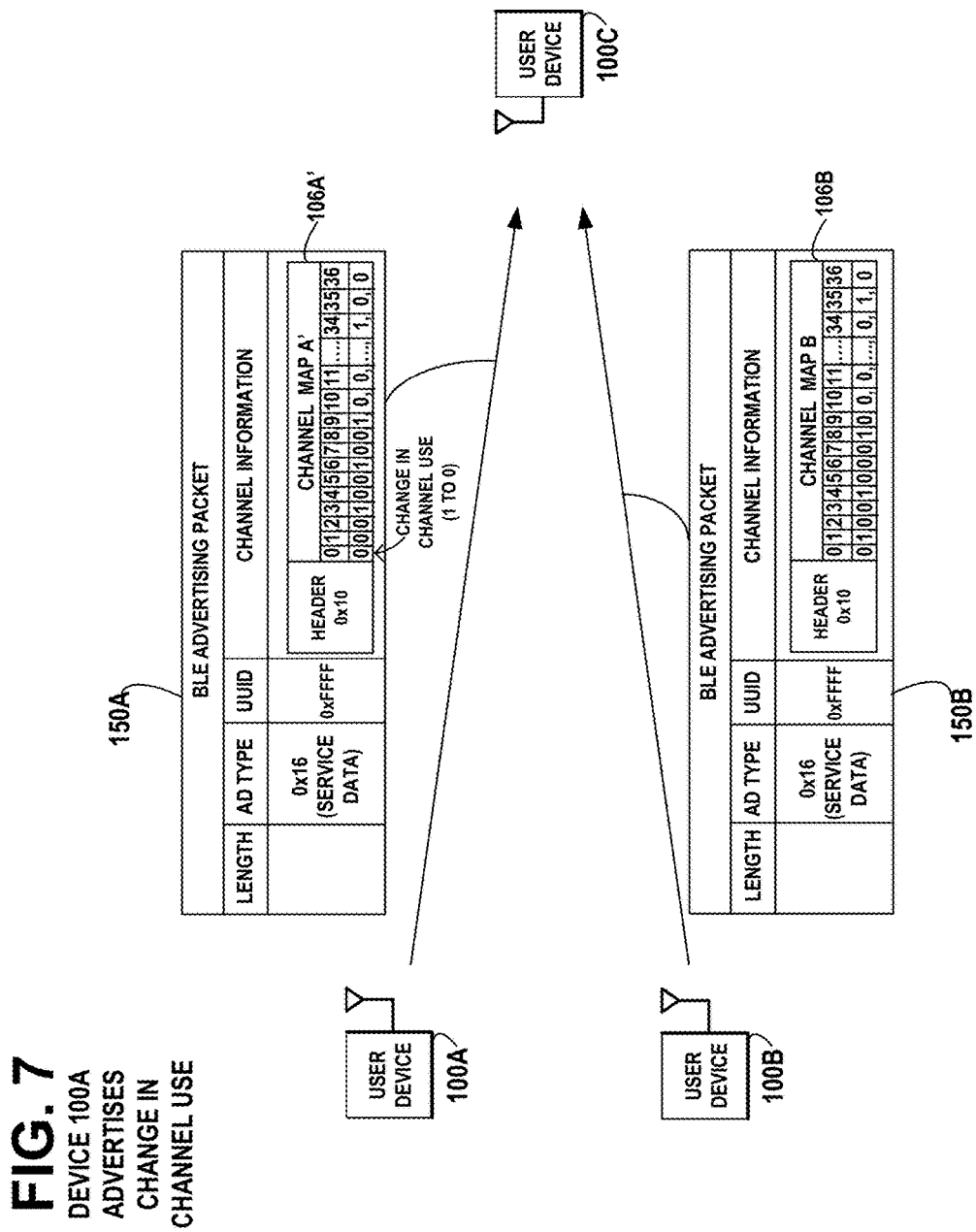

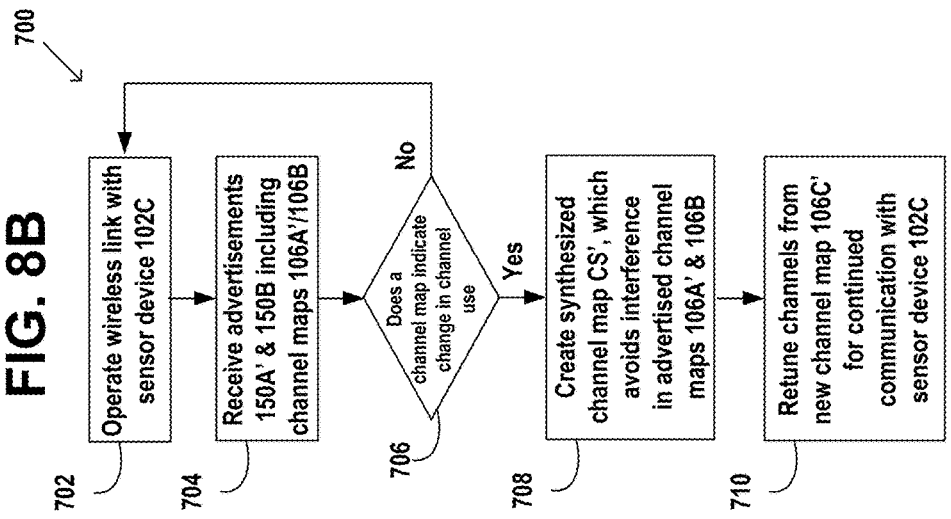
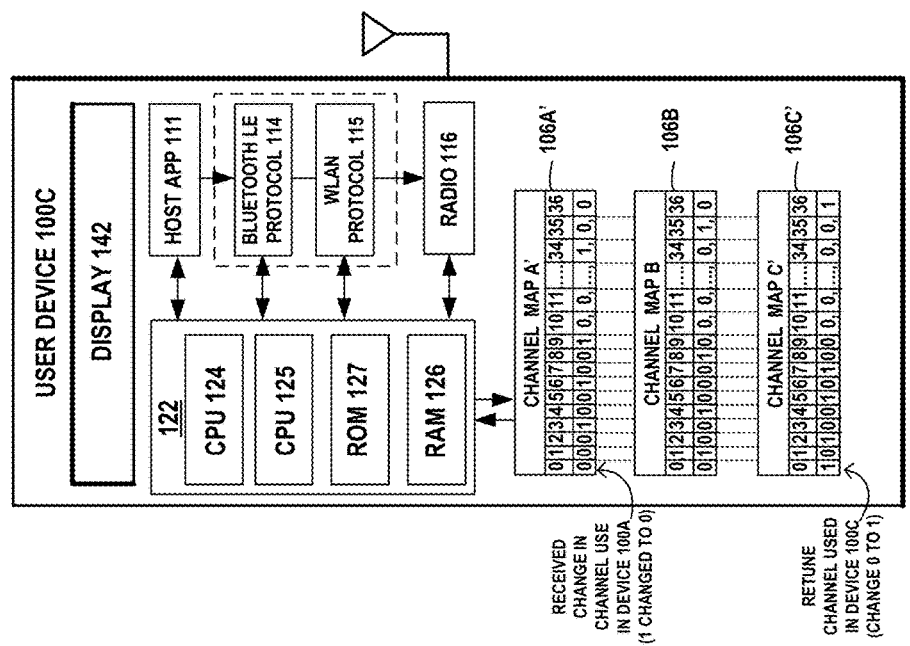

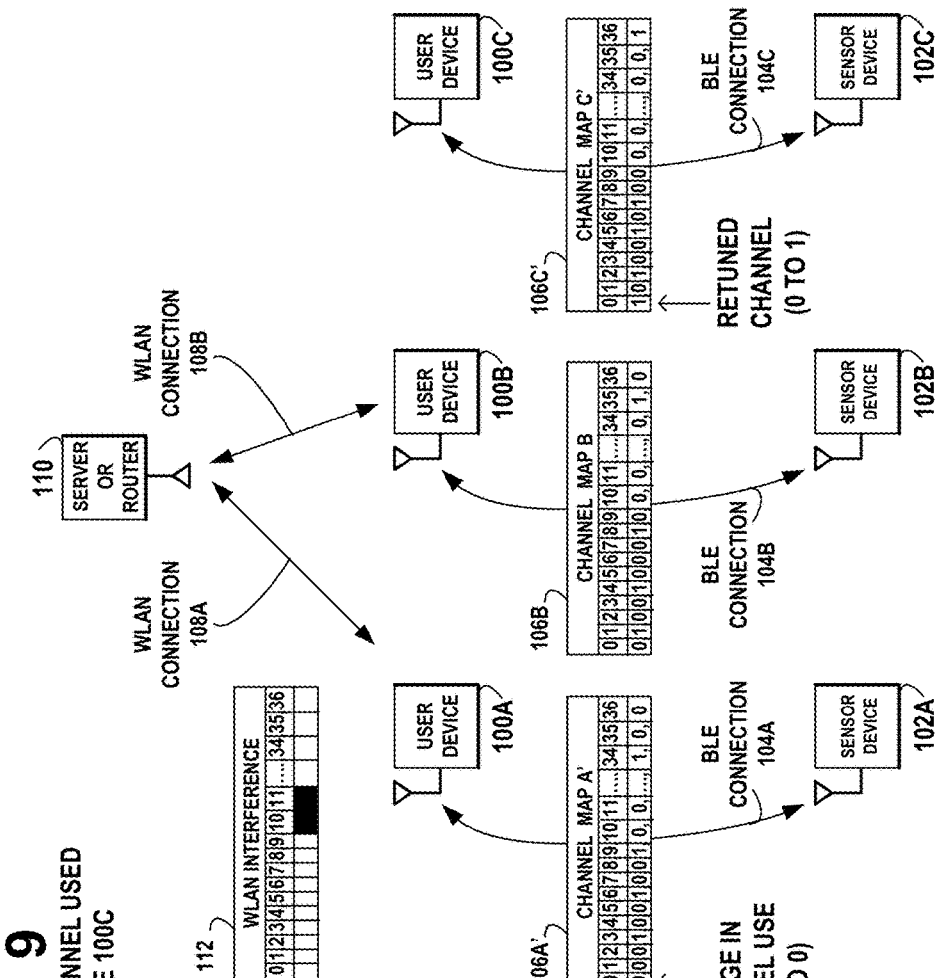

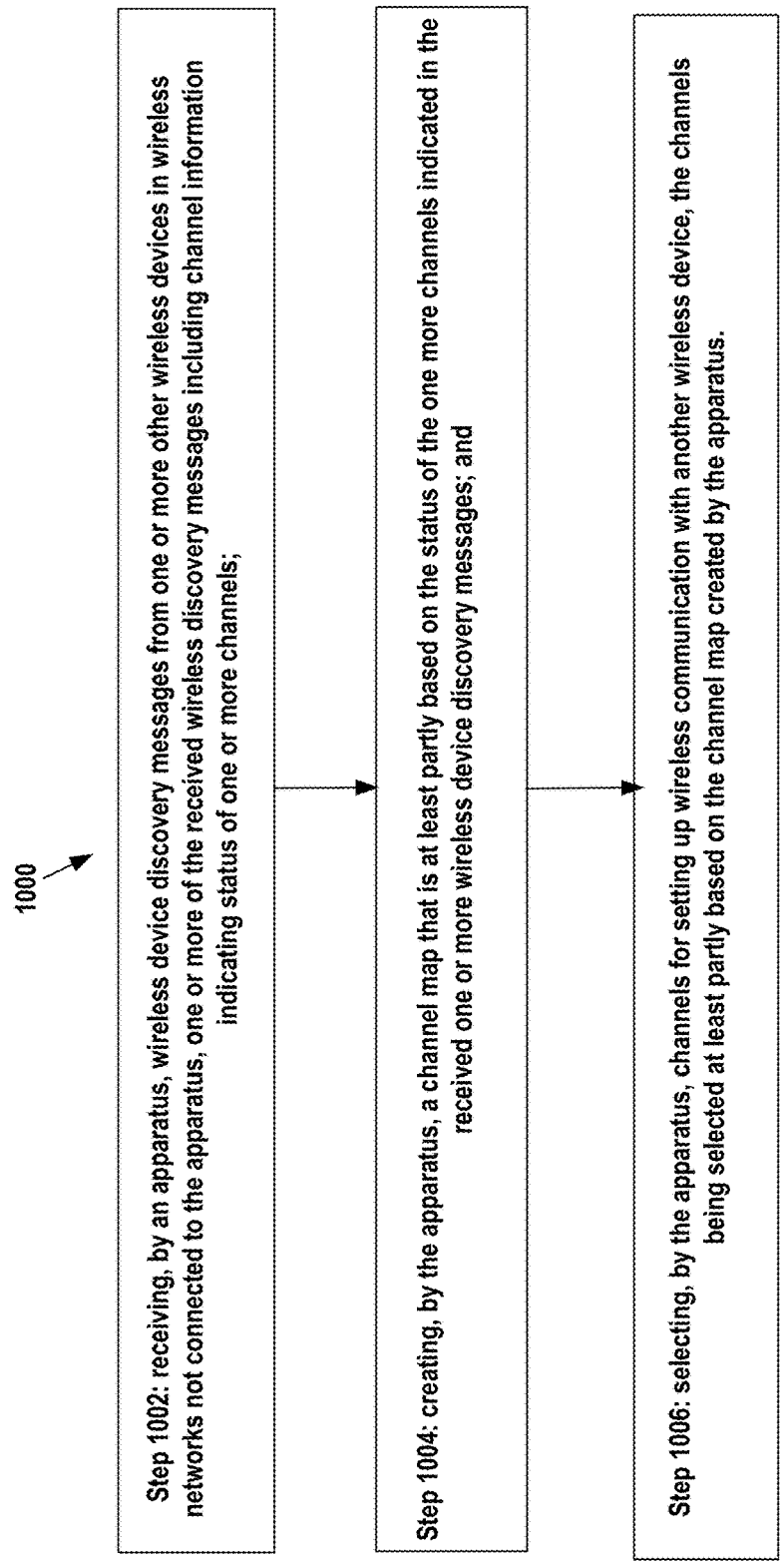

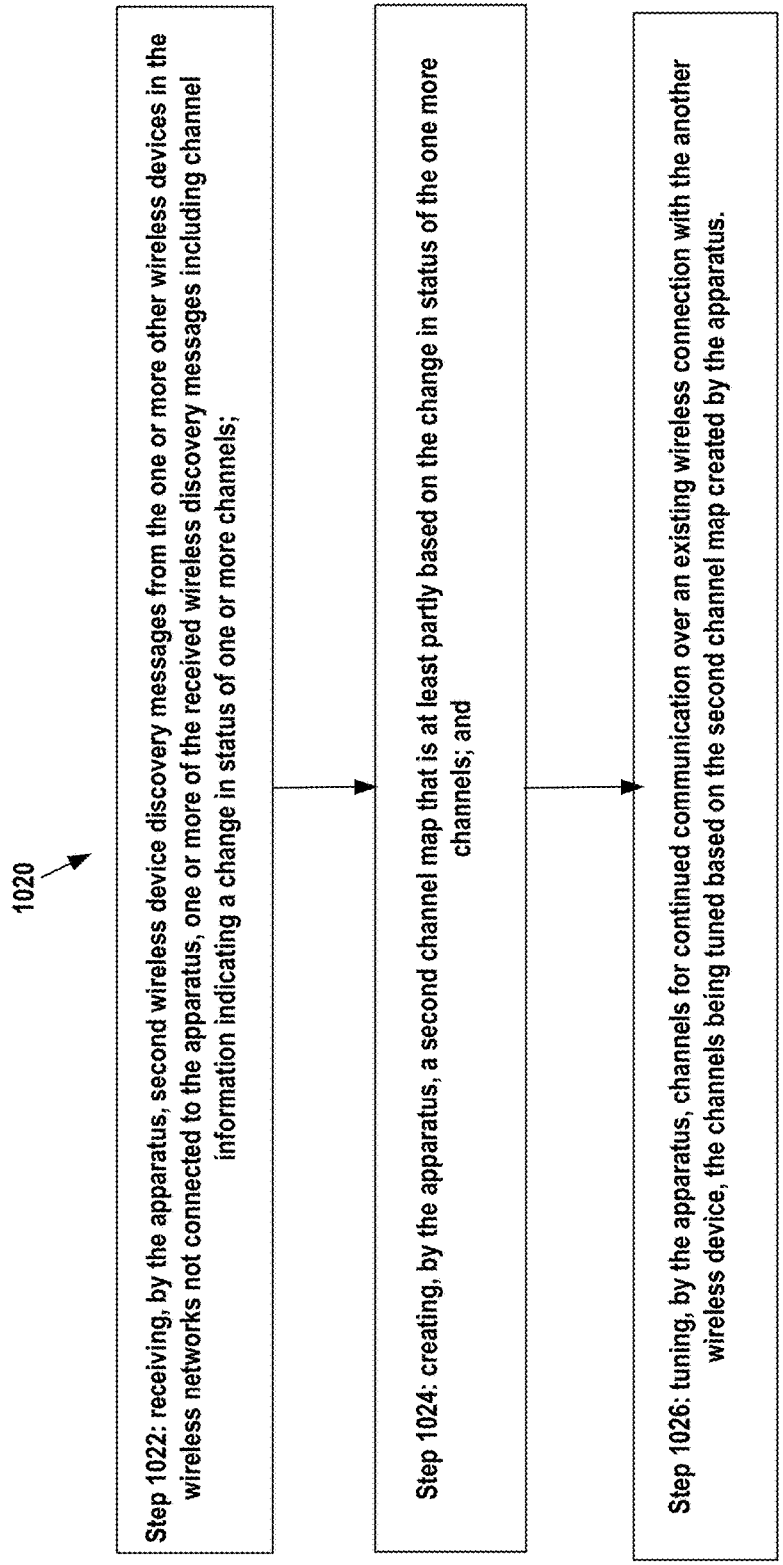

FIG. 10B
RETUNE CHANNELS FROM NEW CHANNEL MAP 106C' FOR CONTINUED COMMUNICATION WITH SENSOR DEVICE 102C

Step 1022: receiving, by the apparatus, second wireless device discovery messages from the one or more other wireless devices in the wireless networks not connected to the apparatus, one or more of the received wireless discovery messages including channel information indicating a change in status of one or more channels;

Step 1024: creating, by the apparatus, a second channel map that is at least partly based on the change in status of the one more channels; and Step 1026: tuning, by the apparatus, channels for continued communication over an existing wireless connection with the another wireless device, the channels being tuned based on the second channel map created by the apparatus.

METHOD, APPARATUS, AND COMPUTER PROGRAM PRODUCT FOR WIRELESS SHORT-RANGE COMMUNICATION CHANNEL SELECTION

FIELD

The technology field relates to wireless device features to enable devices to adapt their operating channels according to the environment when initiating connection to avoid interference.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. The Bluetooth™ Core Specification, Version 4.2, Bluetooth™ SIG, Dec. 2, 2014 (incorporated herein by reference), describes the Bluetooth™ protocol (BT) and the Bluetooth™ Low Energy protocol (BLE).

SUMMARY

Method, apparatus, and computer program product example embodiments of wireless device features to enable devices to adapt their channel maps when initiating connection to avoid interference.

An example embodiment of the invention includes a method comprising:

receiving, by an apparatus, wireless device discovery messages from one or more other wireless devices in wireless networks not connected to the apparatus, one or more of the received wireless discovery messages including channel information indicating status of one or more channels;

creating, by the apparatus, a channel map that is at least partly based on the status of the one more channels indicated in the received one or more wireless device discovery messages; and selecting, by the apparatus, channels for setting up wireless communication with another wireless device, the channels being selected at least partly based on the channel map created by the apparatus.

An example embodiment of the invention includes a method comprising:

receiving, by the apparatus, second wireless device discovery messages from the one or more other wireless devices in the wireless networks not connected to the apparatus, one or more of the received wireless discovery messages including channel information indicating a change in status of one or more channels;

creating, by the apparatus, a second channel map that is at least partly based on the change in status of the one more channels; and tuning, by the apparatus, channels for continued communication over an existing wireless connection with the another wireless device, the channels being tuned based on the second channel map created by the apparatus.

An example embodiment of the invention includes a method comprising:

wherein the channel information in the received wireless discovery message comprises at least one of a bit mask of used channels, a bit mask of used channels where a last several bits are used to indicate channel occupancy rate, and predefined used channel sets.

An example embodiment of the invention includes a method comprising:

wherein the wireless device discovery messages received by the apparatus are Bluetooth Low Energy advertising messages and the channel information included in the advertising messages is a channel map indicating wireless channels in use by the one of the one or more other wireless devices that sent the received advertising messages, the channel map further indicating one or more wireless channels having interference.

An example embodiment of the invention includes a method comprising:

wherein the creating, by the apparatus, of a channel map is performed by creating a new channel map of the apparatus using an LE Set Host Channel Classification Command, to specify a channel classification based on channels indicated in the received wireless device discovery messages.

An example embodiment of the invention includes a method comprising:

wherein the channel information indicates a subset of channels used by the one or more other wireless devices, and channels that are not members of the subset, which are not used by the one or more other wireless devices, but the channel information does not indicate unused channels that are unsuitable for use.

An example embodiment of the invention includes a method comprising:

wherein the channel information indicates a subset of channels used by the one or more other wireless devices, channels that are not members of the subset, which are suitable for use but are not used by the one or more other wireless devices, and channels that are unsuitable for use.

An example embodiment of the invention includes a method comprising:

wherein the channel information indicates channels that are unsuitable for use.

An example embodiment of the invention includes a method comprising:

connecting, by the apparatus, with the another wireless device, using the channels selected by the apparatus, at least partly based on the channel map created by the apparatus.

An example embodiment of the invention includes a method comprising:

generating, by the apparatus, a non-connectable discovery packet including the channel map created by the apparatus; and communicating, by the apparatus, the non-connectable discovery packet while the apparatus is connected to the another wireless device.

An example embodiment of the invention includes an apparatus comprising:

at least one processor;

at least one memory including computer program code;

the at least one memory and the computer program code configured to, with the at least one processor, cause the apparatus at least to:

receive wireless device discovery messages from one or more other wireless devices in wireless networks not connected to the apparatus, one or more of the received wireless discovery messages including channel information indicating status of one or more channels;

create a channel map that is at least partly based on the status of the one more channels indicated in the received one or more wireless device discovery messages; and select channels for setting up wireless communication with another wireless device, the channels being selected at least partly based on the channel map created by the apparatus.

An example embodiment of the invention includes an apparatus comprising:

the at least one memory and the computer program code configured to, with the at least one processor, cause the apparatus at least to:

the at least one memory and the computer program code configured to, with the at least one processor, cause the apparatus at least to:

receive second wireless device discovery messages from the one or more other wireless devices in the wireless networks not connected to the apparatus, one or more of the received wireless discovery messages including channel information indicating a change in status of one or more channels;

create a second channel map that is at least partly based on the change in status of the one more channels; and tune channels for continued communication over an existing wireless connection with the another wireless device, the channels being tuned based on the second channel map created by the apparatus.

An example embodiment of the invention includes an apparatus comprising:

wherein the channel information in the received wireless discovery message comprises at least one of a bit mask of used channels, a bit mask of used channels where a last several bits are used to indicate channel occupancy rate, and predefined used channel sets.

An example embodiment of the invention includes an apparatus comprising:

wherein the wireless device discovery messages received by the apparatus are Bluetooth Low Energy advertising messages and the channel information included in the advertising messages is a channel map indicating wireless channels in use by the one of the one or more other wireless devices that sent the received advertising messages, the channel map further indicating one or more wireless channels having interference.

An example embodiment of the invention includes an apparatus comprising:

wherein the creating, by the apparatus, of a channel map is performed by creating a new channel map of the apparatus using an LE Set Host Channel Classification Command, to specify a channel classification based on channels indicated in the received wireless device discovery messages.

An example embodiment of the invention includes a computer program product comprising computer executable program code recorded on a computer readable, non-transitory storage medium, the computer executable program code comprising:

code for receiving, by an apparatus, wireless device discovery messages from one or more other wireless devices in wireless networks not connected to the apparatus, one or more of the received wireless discovery messages including channel information indicating status of one or more channels;

code for creating, by the apparatus, a channel map that is at least partly based on the status of the one more channels indicated in the received one or more wireless device discovery messages; and code for selecting, by the apparatus, channels for setting up wireless communication with another wireless device, the channels being selected at least partly based on the channel map created by the apparatus.

An example embodiment of the invention includes a computer program product comprising:

code for receiving, by the apparatus, second wireless device discovery messages from the one or more other wireless devices in the wireless networks not connected to the apparatus, one or more of the received wireless discovery messages including channel information indicating a change in status of one or more channels;

code for creating, by the apparatus, a second channel map that is at least partly based on the change in status of the one more channels; and code for tuning, by the apparatus, channels for continued communication over an existing wireless connection with the another wireless device, the channels being tuned based on the second channel map created by the apparatus.

An example embodiment of the invention includes a computer program product comprising:

the channel information in the received wireless discovery message comprises at least one of a bit mask of used channels, a bit mask of used channels where a last several bits are used to indicate channel occupancy rate, and predefined used channel sets.

An example embodiment of the invention includes a computer program product comprising:

wherein the wireless device discovery messages received by the apparatus are Bluetooth Low Energy advertising messages and the channel information included in the advertising messages is a channel map indicating wireless channels in use by the one of the one or more other wireless devices that sent the received advertising messages, the channel map further indicating one or more wireless channels having interference.

An example embodiment of the invention includes a computer program product comprising:

wherein the creating, by the apparatus, of a channel map is performed by creating a new channel map of the apparatus using an LE Set Host Channel Classification Command, to specify a channel classification based on channels indicated in the received wireless device discovery messages.

DESCRIPTION OF THE FIGURES

FIG. 1 is an example diagram of several wireless networks operating in close proximity to another device that has difficulty in setting up an independent network due to the interference from the existing networks.

FIG. 4A is an example functional block diagram of the third user device receiving the first and second advertising packets, creating a third channel map of channels that avoid BLE interfering signals from the ongoing communications in the first and second BLE networks, and selecting channels for setting up wireless communication with the third sensor device, which is not connected to the first or second BLE networks, the selected channels being selected from the third channel map created by the third user device, in accordance with an example embodiment of the invention.

FIG. 4B is an illustration of an example flow diagram of example steps performed by the third user device of FIG. 4A, in accordance with an example embodiment of the invention.

FIG. 4C is an example functional block diagram of the third user device and the third sensor device, showing example steps performed by the third user device to connect to the third sensor device using the third channel map and start advertising the third channel map with non-connectable, undirected advertising packets, in accordance with an example embodiment of the invention.

FIG. 6 is an example diagram of wireless networks similar to FIG. 1, except that the third user device has an existing, active wireless connection with the third sensor device forming a third BLE network that is not connected to either the first or the second BLE networks. The figure shows that a change has occurred in the channel use in the first BLE network and the first channel map indicates the change in channel use.

FIG. 7 is an illustration of an example of the advertising packets, similar to FIG. 3, except that the first channel map in the first advertising packet is a changed channel map that indicates the change that has occurred in the channel use in the first BLE network.

FIG. 8A is an example functional block diagram of the third user device, similar to FIG. 4A, except that the changed first channel map indicates the change that has occurred in the channel use in the first BLE network. The third user device creates a new channel map of channels that avoid the changed BLE interfering signals from the ongoing communications in the first and second BLE networks. The third user device selects channels to tune for continued communication over the existing wireless connection with the third sensor device, the channels being tuned based on the second channel map created by the third user device, in accordance with an example embodiment of the invention.

FIG. 8B is an illustration of an example flow diagram of example steps performed by the third user device, similar to FIG. 4B, except that the changed first channel map indicates the change that has occurred in the channel use in the first BLE network. The flow diagram shows the third user device selecting channels for tuning for continued communication over the existing wireless connection with the third sensor device, the channels being tuned based on the second channel map created by the third user device, in accordance with an example embodiment of the invention.

FIG. 9 is an example diagram of wireless networks similar to FIG. 5, except that the third user device has tuned the channels for continued communication over the existing wireless connection with the third sensor device, the channels being tuned based on the second channel map created by the third user device, in accordance with an example embodiment of the invention.

FIG. 10A is an illustration of an example flow diagram of an example process in the third user device, to create a channel map based on the advertised channel maps, in accordance with an example embodiment of the invention.

FIG. 10B is an illustration of an example flow diagram of an example process in the third user device, to tune channels from the new channel map for continued communication with sensor device, in accordance with an example embodiment of the invention.

DISCUSSION OF EXAMPLE EMBODIMENTS OF THE INVENTION

Figure 2A:
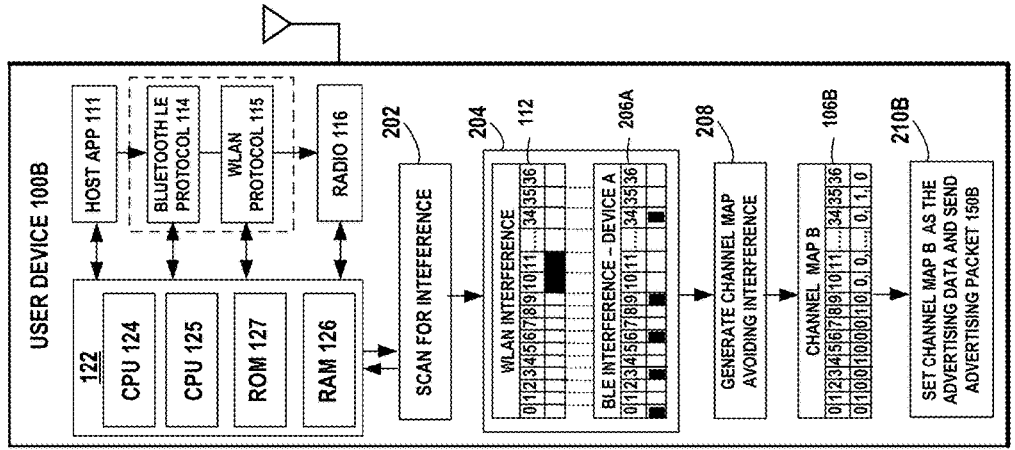
FIG. 2A is an example functional block diagram of a first user device, showing example steps performed to generate a first channel map and to set the first channel map as the advertising data for a first BLE advertising packet.

This section is organized into the following topics:
A. Wireless Short-Range Communication Networks
B. Bluetooth™ Low Energy (BLE) Technology
C. Bluetooth Low Energy Communication Channel Selection A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (BLE), IEEE 802.11 wireless local area network (WLAN), IEEE 802.15.4, and near field communication technologies, such as radio frequency identification (RFID) and near field communication (NFC) technology that enable contactless identification and interconnection of wireless devices. Bluetooth Technology provides an example of wireless short-range communication establishment.

B. Bluetooth™ Low Energy (BLE) Technology

The Bluetooth™ Core Specification, Version 4.2 includes the Bluetooth LE protocol for products that require lower power consumption, lower complexity, and lower cost than would be possible using the BR/EDR protocol. Bluetooth LE is designed for applications requiring very-low power idle and active modes. These applications typically produce data with low data rates and/or have only small amount of data to be exchange during the active connection or in the idle mode. Bluetooth LE provides a simple device discovery, short duty cycles, and low overhead in data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer may have multiple instances of the Link Layer state machine. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Bluetooth Basic Rate/Enhanced Data Rate (BR/EDR) radio. Bluetooth LE supports very short data packets, from 10 octets to a maximum of 265 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.2, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

In the Bluetooth™ Core Specification, Version 4.2, the initiator device receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.2, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth™ Specification Version 4.2, Bluetooth LE device discovery involves different operational processes for devices with different roles. In particular:

Advertiser device performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Scanner device performs the scanning process. A scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONNECT_REQ" to establish a connection with that advertiser. For a scanner, it can send out a "SCAN_REQ" to ask for more information from that advertiser.

The CONNECT_REQ PDU has a payload field that consists of InitA, AdvA and LLData fields. The InitA field contains the Initiator's public or random device address, as indicated by a transmit address flag. The AdvA field contains the advertiser's public or random device address, as indicated by a receive address flag. The LLData consists of 10 fields, such as the Link Layer connection's Access Address, a channel map, a hop count increment, and other parameters needed to set up the connection.

The SCAN_REQ PDU has a payload field that consists of ScanA and AdvA fields. The ScanA field contains the scanner's public or random device address, as indicated by a transmit address flag. The AdvA field is the address of the device to which this PDU is addressed and contains the advertiser's public or random device address, as indicated by a receive address flag.

Example non-limited use cases for Bluetooth LE technology include sports and fitness, security and proximity and smart energy. Bluetooth LE technology is designed for devices to have a battery life of up to several years such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ LE Discovery:

At the start of each advertising event, the advertiser sends an advertising packet corresponding to the advertising event type. Depending on the type of advertising packet, the scanner may make a request to the advertiser on the same advertising PHY channel, which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Initiator devices that are trying to form a connection to another device listen for connectable advertising packets. If the advertiser is using a connectable advertising event, an initiator may make a connection request using the same advertising PHY channel on which it received the connectable advertising packet. The advertising event is ended and connection events begin if the advertiser receives and accepts the request for a connection is initiated. Once a connection is established, the initiator becomes the master device in a piconet and the advertising device becomes the slave device. Connection events are used to send data packets between the master and slave devices.

Devices are identified using a device address. Device addresses may be either a public device address or a random device address. A public device address and a random device address are both 48 bits in length. A device shall contain at least one type of device address and may contain both.

2. Bluetooth LE Timing in the Advertising, Scanning, and Initiator States:

a. Bluetooth LE Advertising State:

For all undirected advertising events or connectable directed advertising events used in a low duty cycle mode, the time between the start of two consecutive advertising events (T_advEvent) is computed as follows for each advertising event:

$$T\_advEvent = advInterval + advDelay$$

The advInterval shall be an integer multiple of 0.625 ms in the range of 20 ms to 10.24 s. If the advertising event type is either a scannable undirected event type or a non-connectable undirected event type, the advInterval shall not be less than 100 ms. If the advertising event type is a connectable undirected event type or connectable directed event type used in a low duty cycle mode, the advInterval can be 20 ms or greater. The advDelay is a pseudo-random value with a range of 0 ms to 10 ms generated by the Link Layer for each advertising event. Bluetooth™ Core Specification, Version 4.2, [Vol. 6] FIG. 4.1 shows an example timing diagram of advertising events perturbed in time using advDelay.

b. Bluetooth LE Scanning State:

If the advertiser receives a SCAN_REQ PDU that contains its device address from a scanner allowed by the advertising filter policy, it shall reply with a SCAN_RSP PDU on the same advertising channel index. After the SCAN_RSP PDU is sent, or if the advertising filter policy prohibited processing the SCAN_REQ PDU, the advertiser shall either move to the next used advertising channel index to send another ADV_IND PDU, or close the advertising event. Bluetooth™ Core Specification, Version 4.2, [Vol. 6] FIG. 4.3 shows an example timing diagram of a connectable undirected advertising event with SCAN_REQ and SCAN_RESP PDUs in the middle of an advertising event.

c. Bluetooth LE Initiator State and Connection Setup:

If an initiator sends the advertiser receives a CONNECT_REQ PDU that contains the advertiser's device address, and the initiator is allowed by the advertising filter policy, the Link Layer of the advertiser shall exit the Advertising State and transition to the Connection State in the Slave Role. If the advertising filter policy prohibited processing the received CONNECT_REQ PDU, the advertiser shall either move to the next used advertising channel index to send another ADV_IND PDU, or close the advertising event. Bluetooth™ Core Specification, Version 4.2, [Vol. 6] FIGS. 4.13 and 4.14 show example timing diagrams of a Connection setup 3. Bluetooth™ Host Controller Interface The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core 4.2 Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

a. Discovery Phase HCI Commands and Events

HCI LE Advertising Report Event

The Bluetooth LE device discovery group of commands and events allow a device to discover other devices in the surrounding area. The Bluetooth LE host controller interface includes the HCI LE Advertising Report event that indicates that a Bluetooth device or multiple Bluetooth devices have been detected during an active scan or during a passive scan.

The scanning device may ask further information of advertising device with scan request packet. Once advertiser has received scan request packet it may answer with scan response packet.

LE Set Advertising Data Command

The LE_Set_Advertising_Data command is used to set the data used in advertising packets that have a data field. Only the significant part of the Advertising_Data is transmitted in the advertising packets, as defined in [Vol 3] Part C, Section 11 of the Bluetooth Core 4.2 Specification.

LE Set Advertise Enable Command

The LE_Set_Advertise_Enable command is used to request the Controller to start or stop advertising. The Controller manages the timing of advertisements as per the advertising parameters given in the LE_Set_Advertising_Parameters command. The Controller shall continue advertising until the Host issues an LE_Set_Advertise_Enable command with Advertising_Enable set to 0x00 (Advertising is disabled) or until a connection is created or until the Advertising is timed out due to high duty cycle Directed Advertising. In these cases, advertising is then disabled.

LE Read Channel Map Command

The LE_Read_Channel_Map command returns the current Channel_Map for the specified Connection_Handle. The returned value indicates the state of the Channel_Map specified by the last transmitted or received Channel_Map (in a CONNECT_REQ or LL_CHANNEL_MAP_REQ message) for the specified Connection_Handle, regardless of whether the Master has received an acknowledgement.

LE Set Host Channel Classification Command

The LE_Set_Host_Channel_Classification command allows the Host to specify a channel classification for data channels based on its "local information". This classification persists until overwritten with a subsequent LE_Set_Host_Channel_Classification command or until the Controller is reset using the Reset command (see [Vol 6] Part B, Section 4.5.8.1 of the Bluetooth Core 4.2 Specification). If this command is used, the Host should send it within 10 seconds of knowing that the channel classification has changed. The interval between two successive commands sent shall be at least one second.

C. Wireless Short-Range Communication Channel Selection

The interference caused to BLE communication, for example by WLAN networks, can decrease the number of usable BLE channels from 37 to only few. Under these circumstances, in order to communicate, the number of co-located BLE networks must be greatly reduced, which causes problems when multiple communication links need to work in the vicinity of each other.

FIG. 1 is an example diagram of several wireless networks operating in close proximity to another device that has difficulty in setting up an independent network due to the interference from the existing networks. The figure shows an example of a first user device 100A actively communicating in a first Bluetooth Low Energy (BLE) network 104A with a first sensor device 102A and a second user device 100B actively communicating in a second BLE network 104B with a second sensor device 102B. A third user device 100C, which is receiving interfering signals from the ongoing communications in the first and second BLE networks 104A and 104B, wishes to set up an interference-free wireless link to a third sensor device 102C, forming a third BLE network. The figure shows a first channel map 106A of the BLE channels being used in the first network 104A and a second channel map 106B of the BLE channels being used in the second network 104B. In addition, the first and second user devices 100A and 100B are each actively communicating over WLAN network connections 108A and 108B with a server or router 110. WLAN network connections 108A and 108B may be in the same WLAN network. The figure shows the presence of WLAN interfering signals 112 from the ongoing communications over the WLAN network connections 108A and 108B, at frequencies corresponding to BLE channels. In an example use case, the sensor devices 102A, 102B, and 102C may be heart rate monitors respectively worn by three users of the user devices 100A, 100B, and 100C. The three users may be participating in an indoor cycling or spinning class and the position of the exercise bicycles being operated by the users are positioned closely enough together to cause interference by signals from the ongoing communications over the WLAN network connections 108A and 108B and the first and second BLE networks 104A and 104B, at frequencies corresponding to BLE channels.

In example embodiments of the invention, the user devices 100A, 100B, and 100C may be, for example, a miniature device such as a key fob, smart card, jewelry, or the like. In an example embodiment of the invention, the user devices 100A, 100B, and 100C may be, for example, a relatively larger cell phone, smart phone, flip-phone, PDA, graphic pad. The user devices 100A, 100B, and 100C may also be in an automobile or other vehicle. In embodiments, the relative sizes of the user devices 100A, 100B, and 100C may be arbitrary.

In alternate example embodiments, devices 102A, 102B, and 102C may be other types of BLE wireless devices instead of sensor devices, such as a key fob, smart card, jewelry, or the like. In an example embodiment of the invention, the devices 102A, 102B, and 102C may be, for example, a relatively larger cell phone, smart phone, flip-phone, PDA, graphic pad. In embodiments, the relative sizes of the devices 102A, 102B, and 102C may be arbitrary.

FIG. 2A is an example functional block diagram of the actively communicating first user device 100A, showing examples of a host application 111, processor components 122, BLE and WLAN protocol components 114 and 115, and radio 116.

The figure shows example steps performed by the first user device 100A to scan for interference at step 202 and detect at step 204 any WLAN interfering signals 112 and BLE interfering signals 206B from the ongoing communications over the WLAN network connections 108A and 108B and the second BLE network 104B, at frequencies corresponding to BLE channels. The energy detection may be performed by scanning the plurality of BLE frequency bands that may be utilized for BLE communication. A channel map based on channel classification may be generated at step 208, to enable or disable at least some of the BLE frequency bands used by the first user device 100A, by detecting interference energy associated with interference in or communication via any of the plurality of BLE channels. The figure shows an example channel map 106A, which indicates the BLE channels used by the first user device 100A. The channel map A (106A) is also shown in Table 1, below. The channel map 106A indicates an example set of physical channels 0, 3, 6, 9, and 34, whose use is indicated by the binary channel classification number "1", used in the network 104A for the active communications between user device 100A and sensor device 102A. The channel map 106A indicates an example set of physical channels 1, 2, 4, 5, 7, 8, 10, 11, 35, and 36 indicated by the binary channel classification number "0", which are not used in the network 104A for the active communications between user device 100A and sensor device 102A. In addition, the channel map 106A may indicate certain channels are unused, such as channels 10 and 11 indicated by the binary channel classification number "0", because those channels contain WLAN interference. There are 37 BLE channels. The user device 100A may reduce this number through the channel map indicating both the used and the unused channels. When the hopping pattern hits an unused channel, indicated as "0", the unused channel may be replaced with the next available channel from the set of used channels. While in a connection the first user device 100A may change the channel map 106A when necessary to avoid new interferers.

The figure shows an example step performed by the first user device 100A to set the first channel map 106A as the advertising data for a first BLE advertising packet 150A, at step 210A. The LE_Set_Advertising_Data command may be used to set the data in the advertising packet 150A. The LE_Set_Advertise_Enable command is then used to request the controller to start advertising by transmitting the advertising packet 150A shown in FIG. 3. The first BLE advertising packet 150A is a wireless discovery message including channel information including the first channel map 106A.

Bluetooth LE communicates over a total of 40 RF channels, separated by 2 MHz. Data communication between Bluetooth LE devices occurs in 37 pre-specified data channels, of the 40 RF channels. The channel map A (106A) shown in Table 1, has the data channels numbered from 0 to 36 in the upper row of the table. The use state of each corresponding numbered channel is shown as a binary channel classification of one or zero in the lower row of the table. The binary channel classification is one for the active communications in network 104A between user device 100A and sensor device 102A. If there is no active communication in the channel for network 104A, the binary channel classification is zero for the channel. The mapping may also indicate usage of certain predefined hopping schemes, i.e. network 104A may utilize only the channels indicated in the channel map A (106A).

TABLE 1

| Channel Map A (106A) | | | | | | | | | | | | | | | |
| --- | --- | --- | --- | --- | --- | --- | --- | --- | --- | --- | --- | --- | --- | --- | --- |
| Channel | 0 | 1 | 2 | 3 | 4 | 5 | 6 | 7 | 8 | 9 | 10 | 11 | ... 34 | 34 | 36 |
| Use State | 1 | 0 | 0 | 1 | 0 | 0 | 1 | 0 | 0 | 1 | 0 | 0 | 1 | 0 | 0 |

Figure 2B:
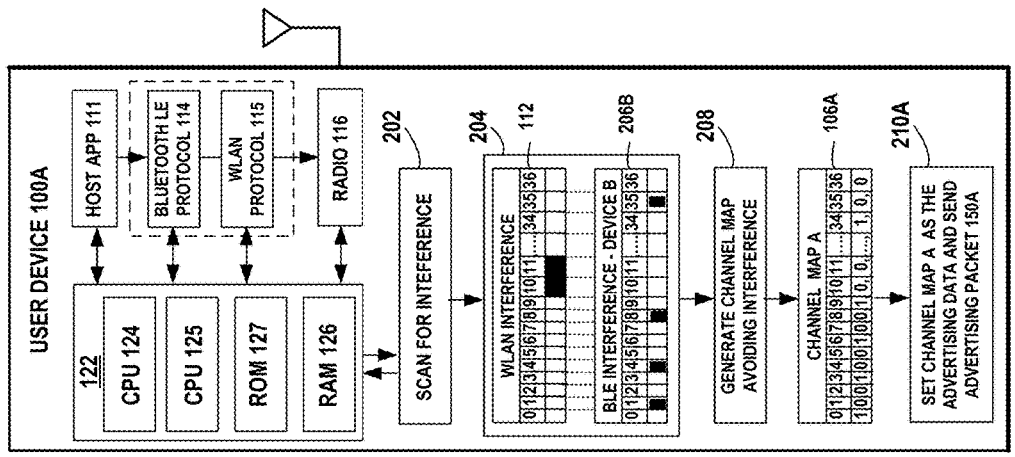
FIG. 2B is an example functional block diagram of a second user device, showing example steps performed to generate a second channel map and to set the second channel map as the advertising data for a second BLE advertising packet.

FIG. 2B is an example functional block diagram of the actively communicating second user device 100B, which may be similar in structure and function to the first user device 100A in FIG. 2A. The figure shows example steps performed by the second user device 100B to scan for interference and detect any WLAN interfering signals 112 and BLE interfering signals 206A from the ongoing communications over the WLAN network connections 108A and 108B and the first BLE network 104A, at frequencies corresponding to BLE channels.

The figure shows an example channel map 106B, which indicates the BLE channels used by the second user device 100B. The channel map B (106B) is shown in Table 2, below.

Figure 3:
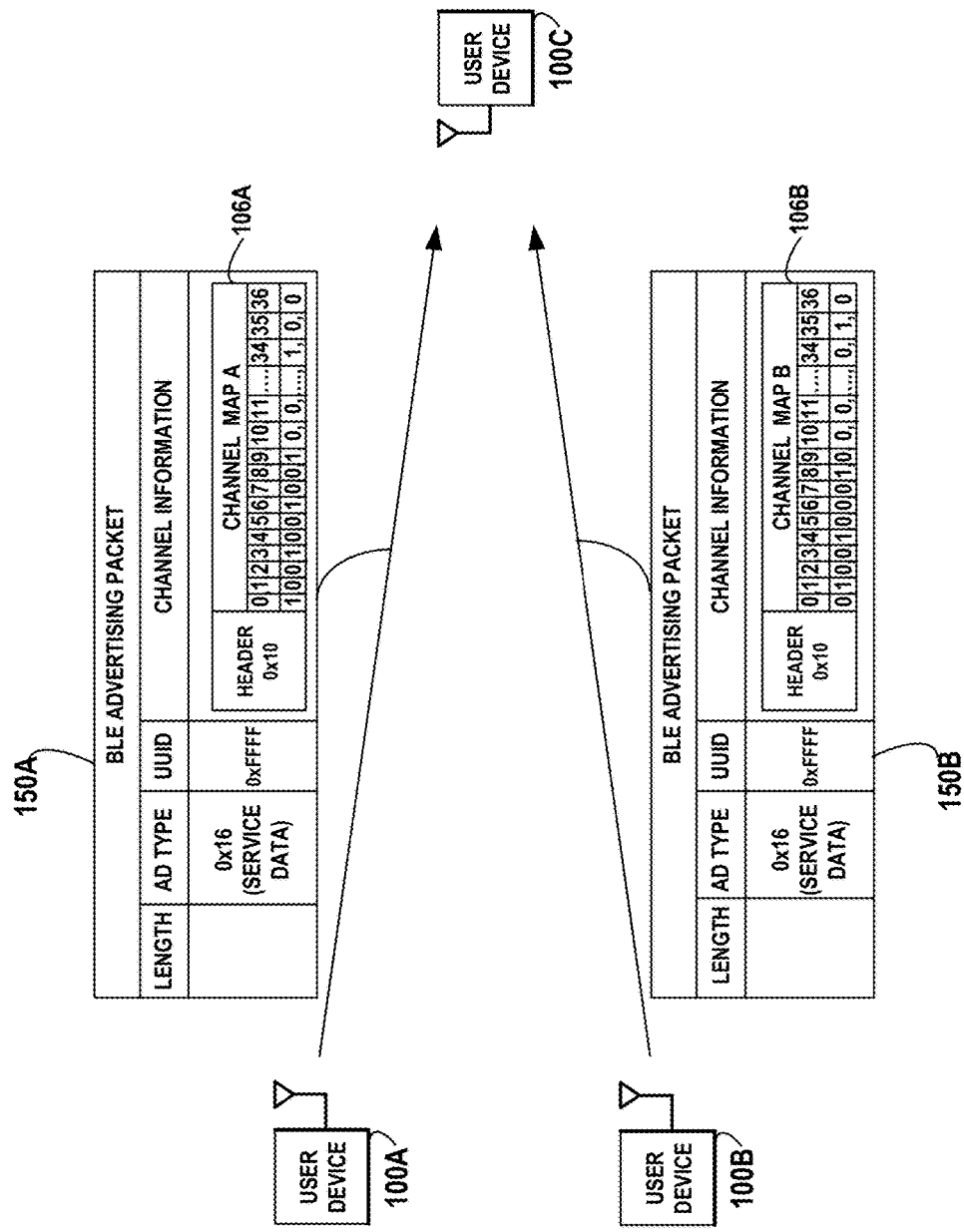
FIG. 3 is an illustration of an example of a first BLE advertising packet transmitted by the first user device including channel information comprising a first channel map and an example of a second BLE advertising packet transmitted by the second user device including channel information comprising a second channel map. The figure shows a third user device receiving the first and second advertising packets, the third user device wishing to set up an interference-free wireless link to a sensor device, forming a separate, third BLE network, separate from the first and second BLE networks, in accordance with an example embodiment of the invention.

The figure shows an example step performed by the second user device 100B to set the second channel map 106B as the advertising data for a second BLE advertising packet 150B shown in FIG. 3. The second user device 100B then starts advertising by transmitting the advertising packet 150B shown in FIG. 3. The second BLE advertising packet 150B is a wireless discovery message including channel information including the second channel map 106B.

Figure 11:
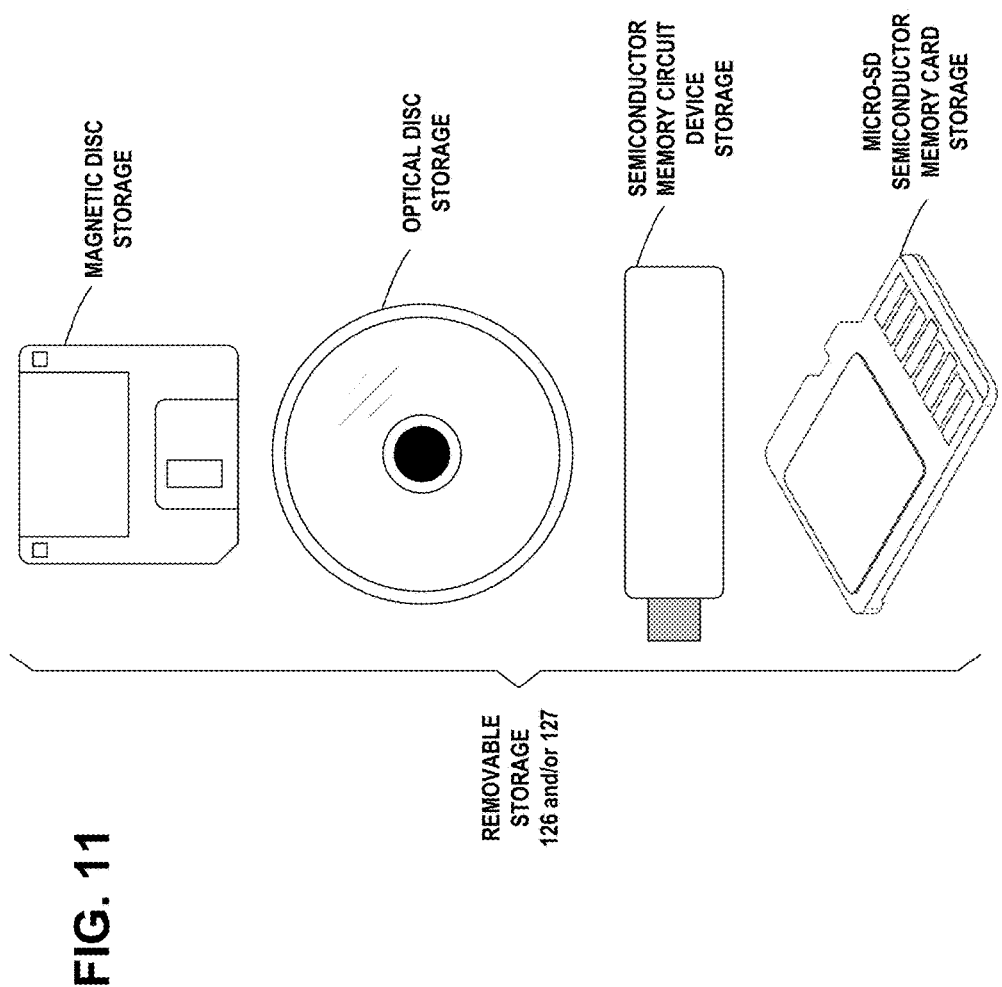
FIG. 11 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

In example embodiments of the invention, the second user device 100A, second user device 100B, and third user device 100C may include the processor 122 that includes from one to many central processing units (CPUs) 124 and/or 125, a random access memory (RAM) 126, a read only memory (ROM) 127, and interface circuits to interface with one or more radio transceivers 116, an antenna, and battery or house power sources. The user devices 100A, 100B, and 100C may include a keypad, display, etc. The RAM and ROM may be removable memory devices such as smart cards, SIMs, WIMs, semiconductor memories such as RAM, ROM, PROMS, flash memory devices, etc., as shown in FIG. 11. In an example embodiment of the invention, the user devices 100A, 100B, and 100C may include the Bluetooth™ Low Energy protocol (BLE) 114 and the WLAN protocol 115.

The channel map B (106B) shown in Table 2, has the data channels numbered from 0 to 36 in the upper row of the table. The use state of each corresponding numbered channel is shown as a binary channel classification of one or zero in the lower row of the table. The binary channel classification is one for the active communications in network 104B between user device 100B and sensor device 102B. If there is no active communication in the channel for network 104B, the binary channel classification is zero for the channel.

100A as a wireless discovery message including channel information comprising the first channel map 106A and an example of the second BLE advertising packet 150B transmitted by the second user device 100B as a wireless discovery message including channel information comprising the second channel map 106B. The figure shows the third user device 100C receiving the first and second advertising packets 150A and 150B. The third user device wishes to set up an interference-free wireless link to the third sensor device 102C, forming a separate, third BLE network, separate from the first and second BLE networks 104A and 104B, in accordance with an example embodiment of the invention.

The format of advertising data for the first and second advertising packets 150A and 150B, excluding the non-significant part, is shown in FIG. 3. The data consists of a significant part and a non-significant part. The significant part contains a sequence of AD structures. Each AD structure have a Length field of one octet, which contains the Length value, and a Data field of Length octets. The first octet of the Data field contains the AD type field. The content of the remaining Length–1 octet in the Data field depends on the value of the AD type field and is called the AD data. The non-significant part extends the Advertising and Scan Response data to 31 octets and contains all-zero octets. Only the significant part of the Advertising data needs to be sent over the air. The Advertising data is sent in advertising events. The Advertising Data is placed in the AdvData field of ADV_IND, ADV_NONCONN_IND, and ADV_SCAN_IND packets.

An example advertising data structure, which is used for delivering channel information in the first and second advertising packets 150A and 150B, is shown in FIG. 3. The advertising data structure contains AD type 0x16, which is <<Service Data—16-bit UUID>> used to identify that the service data for a specific 16-bit UUID will follow. The example UUID may be 0xFFFF. The Channel information field may consist, for example, of the currently used channels, those which are not used and those which are classified as usable channel but are not currently used. The Channel information field may consist of a header field, which may indicate the content of the rest of the field. The channel information in the received first or second advertising packets 150A or 150B, comprises at least one of a bit mask of used channels, a bit mask of used channels where a last several bits are used to indicate channel occupancy rate, and predefined used channel sets.

TABLE 2

| Channel Map B (106B) | | | | | | | | | | | | | | | |
| --- | --- | --- | --- | --- | --- | --- | --- | --- | --- | --- | --- | --- | --- | --- | --- |
| Channel | 0 | 1 | 2 | 3 | 4 | 5 | 6 | 7 | 8 | 9 | 10 | 11 | ... 34 | 34 | 36 |
| Use | 0 | 1 | 0 | 0 | 1 | 0 | 0 | 0 | 1 | 0 | 0 | 0 | 0 | 1 | 0 |

FIG. 3 is an illustration of an example of the first BLE advertising packet 150A transmitted by the first user device FIG. 4A is an example functional block diagram of the third user device 100C, which wishes to set up an interference-free wireless link to the third sensor device 102C, forming a third BLE network 104C, separate from the first and second BLE networks 104A and 104B. The figure shows examples of a host application 111, processor components 122, BLE and WLAN protocol components 114 and 115, and radio 116 of the third user device 100C. The third user device 100C receives the first and second advertising packets 150A and 150B, including the first and second channel information comprising the first and second channel maps 106A and 106B.

The third user device 100C creates a new third channel map 106C, at least partly, based on the received channel maps 106A and 106B, which may be considered as BLE interfering signals from the ongoing communications. The new third channel map 106C may also take into account, for example, WLAN signals it has received (for example received probe responses) or WLAN network channels to which it is currently connected. The channel map 106C is created, at least partly, by determining the unused channels "0" identified in the received channel maps 106A and 106B, and selecting the determined channels as used channels "1" for the new network 104C.

The LE Set Host Channel Classification Command is used to specify the channel classification to set up the new network 104C, based on the channels identified in the received channel maps 106A and 106B. The third user device 100C selects channels to set up the new network 104C for communication with the third sensor device 102C, which is not connected to the first or second BLE networks 104A or 104B, in accordance with an example embodiment of the invention.

Table 3 shows an example calculation of the synthesized channel map CS, based on the binary channel classification of one or zero in for each of the channels identified in the received channel maps 106A and 106B. For each channel, the binary values of the binary channel classifications for each channel map A (106A) and B (106B) are used as the arguments input to a NOR logical binary operator. If all of the binary channel classifications for a given channel are binary zero, then the NOR logical binary result is a binary one, indicating an active channel for the synthesized channel map CS. If any of the binary channel classifications for a given channel is binary one, then the NOR logical binary result is a binary zero, indicating an inactive channel for the synthesized channel map CS. Any number of input arguments may be used for the NOR logical binary operator.

The channel map C (106C) shown in the following Table 4, is at least partly based on synthesized channel map CS of Table 3, and has the data channels numbered from 0 to 36 in the upper row of the table. The use state of each corresponding numbered channel is shown as a binary channel classification of one or zero in the lower row of the table. The binary channel classification will be one for the active communications in network 104C between user device 100C and sensor device 102C. If there will be no active communication in the channel for network 104C, the binary channel classification is zero for the channel. In this example, channels 10 and 11 of the channel map C (106C) are set to zero in response to detected WLAN interference.

TABLE 4

| Channel Map C (106C) | | | | | | | | | | | | | | | | |
| --- | --- | --- | --- | --- | --- | --- | --- | --- | --- | --- | --- | --- | --- | --- | --- | --- |
| Channel | 0 | 1 | 2 | 3 | 4 | 5 | 6 | 7 | 8 | 9 | 10 | 11 | ... | 34 | 34 | 36 |
| Use | 0 | 0 | 1 | 0 | 0 | 1 | 0 | 1 | 0 | 0 | 0 | 0 | | 0 | 0 | 1 |

FIG. 4B is an illustration of an example flow diagram 300 of example steps performed by the third user device 100C, in accordance with an example embodiment of the invention. Step 302 starts the wireless link setup in the user device 100C. Step 304 receives the advertisement packets 150A and 150B, which include the first and second channel information comprising the first and second channel maps 106A and 106B. Step 306 determines whether a connection is to be created to sensor device 102C. If no connection is to be created, the process flows back to step 302. Alternately, if a connection is to be created, the process flows to step 308. Step 308 creates the synthesized channel map CS, which avoids or minimizes the interference represented by the channel maps 106A and 106B. Step 310 selects channels at least partly based on represented by the synthesized channel map CS, for setting up wireless communication with the third sensor device 102C, which is not connected to the first or second BLE networks 104A or 104B, in accordance with an example embodiment of the invention.

FIG. 4C is an example functional block diagram of the third user device 100C and the third sensor device 102C, showing example steps performed by the third user device 100C to connect to the third sensor device 102C using the third channel map 106C and to start advertising the third channel map 106C with non-connectable, undirected advertising packets, in accordance with an example embodiment of the invention.

After the third user device 100C has created the third channel map 106C, as shown for example in FIG. 4B, the third user device 100C wishes to create a connection to third sensor device 102C, forming a third BLE network 104C, which is not connected to the BLE networks 104A and 104B. The figure shows an example step 210C performed by

TABLE 3

| Example Calculation of Synthesized Channel Map CS | | | | | | | | | | | | | | | | |
| --- | --- | --- | --- | --- | --- | --- | --- | --- | --- | --- | --- | --- | --- | --- | --- | --- |
| Channel | 0 | 1 | 2 | 3 | 4 | 5 | 6 | 7 | 8 | 9 | 10 | 11 | ... | 34 | 34 | 36 |
| Map A use | 1 | 0 | 0 | 1 | 0 | 0 | 1 | 0 | 0 | 1 | 0 | 0 | | 1 | 0 | 0 |
| Map B use | 0 | 1 | 0 | 0 | 1 | 0 | 0 | 0 | 1 | 0 | 0 | 0 | | 0 | 1 | 0 |
| Map A use NOR Map B use | 0 | 0 | 1 | 0 | 0 | 1 | 0 | 1 | 0 | 0 | 1 | 1 | | 0 | 0 | 1 | the third user device 100C to set the third channel map 106C as the advertising data for a third BLE advertising packet 160C. The third channel map 106C may be placed in the AdvData field of a connectable ADV_IND packet 160C. The LE_Set_Advertising_Data command may be used to set the data in the advertising packet 160C. The LE_Set_Advertise_Enable command is then used at step 220C, to request the controller to start advertising by transmitting the advertising packet 160C. The third BLE advertising packet 160C is a wireless discovery message including channel information including the third channel map 106C.

If the sensor device 102C is in the initiator state, then when it receives the advertising packet 160C, it may send a connect request (CONNECT_REQ) packet 170C to the third user device 100C on the same advertising PHY channel. The CONNECT_REQ request includes a field for ChannelMap, which may carry a copy of the third channel map 106C. When the third user device 100C receives the CONNECT_REQ request 170C in step 230C and accepts the request, a point-to-point connection results between the third sensor device 102C and the third user device 100C, forming the BLE network connection 104C in step 240C.

After the third user device 100C has created the connection to the third sensor device 102C, forming the third BLE network 104C in step 240C, the third user device 100C may start advertising the channel information including the third channel map 106C, with a non-connectable discovery packet, for example the non-connectable, undirected ADV_NONCONN_IND advertising packet 180C. The figure shows an example step 250C performed by the third user device 100C to set the third channel map 106C as the advertising data for the ADV_NONCONN_IND advertising packet 180C. The third channel map 106C may be placed in the AdvData field of the ADV_NONCONN_IND advertising packet 180C. The LE_Set_Advertising_Data command may be used to set the data in the advertising packet 180C. The LE_Set_Advertise_Enable command is then used at step 260C, to request the controller to start advertising by transmitting the ADV_NONCONN_IND advertising packet 180C. The ADV_NONCONN_IND advertising packet 180C is a wireless discovery message including channel information including the third channel map 106C. The non-connectable, undirected advertising packet 180C is transmitted by the third user device 100C while the third user device 100C is connected to the third sensor device 102C.

In accordance with example embodiments of the invention, the third user device 100C may generate different example types of channel maps (106C), which may be transmitted in the ADV_NONCONN_IND advertising packet 180C. Three example embodiments of channel map C (106C), are described in Examples 1, 2, and 3 given below. In Example 1, the channel map C (106C) indicates a subset of channels used by the device 100C, and channels that are not members of the subset, which are not used by the device 100C, but the channel information does not indicate unused channels that are unsuitable for use. In Example 2, the channel map C (106C) indicates a subset of channels used by the device 100C, channels that are not members of the subset, which are suitable for use but are not used by the device 100C, and channels that are unsuitable for use. In Example 3, the channel map C (106C) indicates channels that are unsuitable for use.

Figure 5:
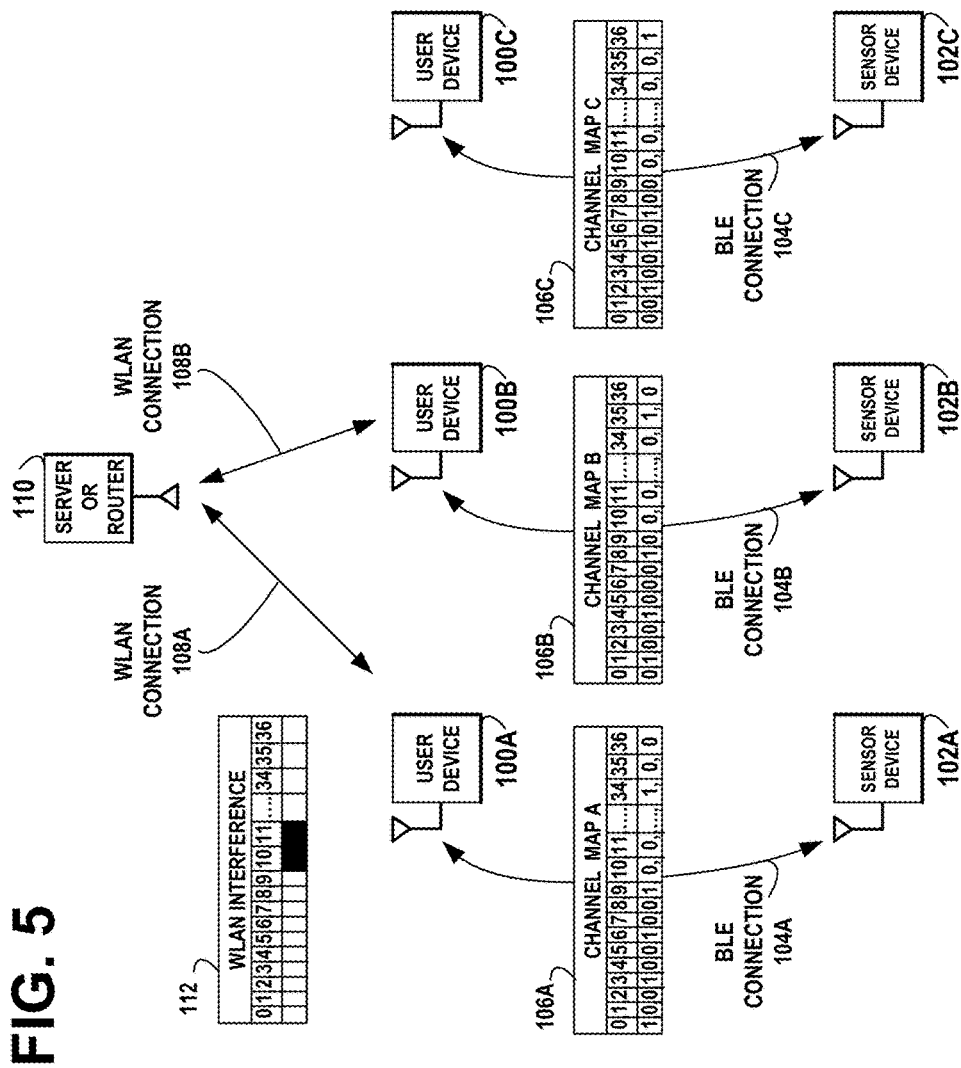
FIG. 5 is an example diagram of wireless networks similar to FIG. 1, wherein the third user device has set up an active connection with the third sensor device for wireless communication, using channels selected from the channel map created by the third user device in FIGS. 4A and 4B, forming a third BLE network that is not connected to either the first or the second BLE networks, in accordance with an example embodiment of the invention.

FIG. 5 is an example diagram of wireless networks similar to FIG. 1, wherein the third user device 100C has set up an active connection with the third sensor device 102C for wireless communication, using BLE channels selected from the channel map 106C created by the third user device 100C in FIGS. 4A and 4B, forming a third BLE network 104C that is not connected to either the first or the second BLE networks 104A or 104B, in accordance with an example embodiment of the invention.

In accordance with example embodiments of the invention, the first user device 100A may generate different example types of channel maps (106A), which may be transmitted in the advertising packet 150A shown in FIG. 3. Three example embodiments of channel maps A (106A), are described in Examples 1, 2, and 3, as follows:

EXAMPLE 1

A first example type of channel map A 106(A) is shown in Table 1, above. In Table 1, device 100A indicates ("Use State") by the binary channel classification number "1", the subset of channels it is using in network 104A, is a subset of all available good channels that device 100A has detected as being suitable for use. All of the remaining channels outside of the subset, are indicated by the binary channel classification number "0", indicating that they are not used in the network 104A. However, device 100A does not indicate which of the unused channels indicated by the binary channel classification number "0", are actually bad channels unsuitable for use because of interference in the channel. Channels 10 and 11 are indicated by the binary channel classification number "0", even though they are actually bad channels unsuitable for use because of WLAN interference in the channel. In Table 1, the channel information indicates a subset of channels used by the device 100A, and channels that are not members of the subset, which are not used by the device 100A, but the channel information does not indicate unused channels that are unsuitable for use.

EXAMPLE 2

A second example type of channel map A 106(A) is shown in the following Table 1[a]. In this second example, as in Example 1, device 100A indicates ("Use State") by the binary channel classification number "1", the subset of channels it is using in network 104A.

However, in this second example type of channel map A 106(A), shown in Table 1[a], device 100A indicates in a second bit map row ("Real Bad"), which unused channels are actually bad channels unsuitable for use because of interference in the channel: Channels 10 and 11 are indicated ("Real Bad") by the binary channel classification number "1", indicating that these channels are actually bad channels unsuitable for use, for example because of WLAN interference in the channel. The channel map (106A) of Table 1[a] transmitted in the advertising packet 150A shown in FIG. 3, informs device 100C that channels 10 and 11 are unsuitable for use. In Table 1[a], the channel information indicates a subset of channels used by the device 100A, channels that are not members of the subset, which are suitable for use but are not used by the device 100A, and channels that are unsuitable for use.

TABLE 1[a]

| Channel Map A (106A) Device A uses Subset of All Good | | | | | | | | | | | | | | | | |
|---|---|---|---|---|---|---|---|---|---|---|---|---|---|---|---|---|
| Channel | 0 | 1 | 2 | 3 | 4 | 5 | 6 | 7 | 8 | 9 | 10 | 11 | ... | 34 | 34 | 36 |
| Use State | 1 | 0 | 0 | 1 | 0 | 0 | 1 | 0 | 0 | 1 | 0 | 0 |  | 1 | 0 | 0 |
| Real Bad |  |  |  |  |  |  |  |  |  |  | 1 | 1 |  |  |  |  |

EXAMPLE 3

A third example type of channel map A 106(A) is shown in the following Table 1[b]. In this third example, there is no indication by device 100A as to which channels it is using in network 104A. In this second example type of channel map A 106(A), shown in Table 1[b], device 100A indicates in a bit map row ("Real Bad"), which channels are actually bad channels unsuitable for use because of interference in the channel: Channels 10 and 11 are indicated ("Real Bad") by the binary channel classification number "1", indicating that these channels are actually bad channels unsuitable for use, for example because of WLAN interference in the channel. The channel map (106A) of Table 1[b] transmitted in the advertising packet 150A shown in FIG. 3, informs device 100C that channels 10 and 11 are unsuitable for use. In Table 1[b], the channel information indicates channels that are unsuitable for use.

TABLE 1[b]

| Channel Map A (106A) Really Bad Interference in Channel | | | | | | | | | | | | | | | | |
|---|---|---|---|---|---|---|---|---|---|---|---|---|---|---|---|---|
| Channel | 0 | 1 | 2 | 3 | 4 | 5 | 6 | 7 | 8 | 9 | 10 | 11 | ... | 34 | 34 | 36 |
| Real Bad |  |  |  |  |  |  |  |  |  |  | 1 | 1 |  |  |  |  |

FIG. 6 is an example diagram of wireless networks similar to FIG. 1, except that the third user device 100C has an existing, active wireless connection 104C with the third sensor device 102C forming a third BLE network 104C that is not connected to either the first or the second BLE networks 104A or 104B. The figure shows that a change has occurred in the channel use in the first BLE network 104A. The first channel map 106A' indicates the change in channel use, wherein the BLE channel "0" has a change from previously having been used "1" to presently not being used "0".

The channel map A' (106A') shown in Table 5, has the data channels numbered from 0 to 36 in the upper row of the table. The use state of each corresponding numbered channel is shown as a binary channel classification of one or zero in the lower row of the table. The binary channel classification is one for the active communications in network 104A between user device 100A and sensor device 102A. If there is no active communication in the channel for network 104A, the binary channel classification is zero for the channel. Table 5 shows the change in channel use in channel numbered "0". The channel map 106A' indicates the change in channel use, wherein the BLE channel "0" has changed from previously having been used "1" to presently not being used "0".

TABLE 5

| Channel Map A' (106A') | | | | | | | | | | | | | | | | |
|---|---|---|---|---|---|---|---|---|---|---|---|---|---|---|---|---|
| Channel | 0 | 1 | 2 | 3 | 4 | 5 | 6 | 7 | 8 | 9 | 10 | 11 | ... | 34 | 34 | 36 |
| Use State | 0 | 0 | 0 | 1 | 0 | 0 | 1 | 0 | 0 | 1 | 0 | 0 |  | 1 | 0 | 0 |

FIG. 7 is an illustration of an example of the advertising packets 150A and 150B, similar to FIG. 3, except that the first channel map 106A' in the first advertising packet 150A, is a changed channel map that indicates the change that has occurred in the channel use in the first BLE network 104A, one, indicating an active channel for the synthesized channel map CS'. If any of the binary channel classifications for a given channel is binary one, then the NOR logical binary result is a binary zero, indicating an inactive channel for the synthesized channel map CS'. Any number of input arguments may be used for the NOR logical binary operator.

TABLE 6

Example Calculation of Synthesized Channel Map CS'

| Channel | 0 | 1 | 2 | 3 | 4 | 5 | 6 | 7 | 8 | 9 | 10 | 11 | ... | 34 | 34 | 36 |
|---|---|---|---|---|---|---|---|---|---|---|---|---|---|---|---|---|
| Map A use | 0 | 0 | 0 | 1 | 0 | 0 | 1 | 0 | 0 | 1 | 0 | 0 | | 1 | 0 | 0 |
| Map B use | 0 | 1 | 0 | 0 | 1 | 0 | 0 | 0 | 1 | 0 | 0 | 0 | | 0 | 1 | 0 |
| Map A use NOR Map B use | 1 | 0 | 1 | 0 | 0 | 1 | 0 | 1 | 0 | 0 | 1 | 1 | | 0 | 0 | 1 | wherein the BLE channel "0" has a change from previously having been used "1" to presently not being used "0".

FIG. 8A is an example functional block diagram of the third user device 100C, similar to FIG. 4A, except that the changed first channel map 106A' indicates the change that has occurred in the channel use in the first BLE network 104A, wherein the BLE channel "0" has a change from previously having been used "1" to presently not being used "0".

The third user device 100C creates a second channel map 106C', at least partly, based on the received channel maps 106A' and 106B, which may be considered as BLE interfering signals from the ongoing communications. The second channel map 106C' may also take into account, for example, WLAN signals it has received (for example received probe responses) or WLAN network channels to which it is currently connected. The second channel map 106C' is created, at least partly, by determining the unused channels "0" identified in the received channel maps 106A' and 106B, and selecting the determined channels as used channels "1" for the new network 104C.

The third user device 100C selects channels for tuning for continued communication over the existing connection over wireless network 104C with the third sensor device 102C, the channels being tuned based on the second channel map 106C' created by the third user device 100C, in accordance with an example embodiment of the invention.

Table 6 shows an example calculation of the synthesized channel map CS', based on the binary channel classification of one or zero for each of the channels identified in the received channel maps 106A' and 106B. For each channel, the binary values of the binary channel classifications for each channel map A' (106A') and B (106B) are used as the arguments input to a NOR logical binary operator. If all of the binary channel classifications for a given channel are binary zero, then the NOR logical binary result is a binary one, indicating an active channel for the synthesized channel map CS'. If any of the binary channel classifications for a given channel is binary one, then the NOR logical binary result is a binary zero, indicating an inactive channel for the synthesized channel map CS'. Any number of input arguments may be used for the NOR logical binary operator.

The second channel map C' (106C') shown in the following Table 7, is at least partly based on synthesized channel map CS', and has the data channels numbered from 0 to 36 in the upper row of the table. The use state of each corresponding numbered channel is shown as a binary channel classification of one or zero in the lower row of the table. The binary channel classification will be one for the active communications in network 104C between user device 100C and sensor device 102C. If there will be no active communication in the channel for network 104C, the binary channel classification is zero for the channel. In this example, channels 10 and 11 of the second channel map C' (106C') are set to zero in response to detected WLAN interference.

TABLE 7

Second Channel Map C' (106C')

| Channel | 0 | 1 | 2 | 3 | 4 | 5 | 6 | 7 | 8 | 9 | 10 | 11 | ... | 34 | 34 | 36 |
|---|---|---|---|---|---|---|---|---|---|---|---|---|---|---|---|---|
| Use | 1 | 0 | 1 | 0 | 0 | 1 | 0 | 1 | 0 | 0 | 0 | 0 | | 0 | 0 | 1 |

FIG. 8B is an illustration of an example flow diagram 700 of example steps performed by the third user device 100C, similar to FIG. 4B, except that the changed channel map 106A' indicates the change that has occurred in the channel use in the first BLE network 104A. The flow diagram step 708 shows the third user device 100C creating the synthesized channel map CS' of channels that avoid the WLAN interfering signals and changed BLE interfering signals from the ongoing communications in the first and second BLE networks 104A and 104B. The flow diagram step 710 shows the third user device 100C selecting channels for tuning for continued communication over the existing connection over wireless network 104C with the third sensor device 102C, the channels being tuned based on the second channel map 106C' created by the third user device 100C, in accordance with an example embodiment of the invention.

FIG. 9 is an example diagram of wireless networks similar to FIG. 5, except that the third user device 100C has tuned the channels for continued communication over the existing wireless connection with the third sensor device over the network 104C, the channels being tuned based on the second channel map 106C' created by the third user device 100C, in accordance with an example embodiment of the invention.

FIG. 10A is an illustration of an example flow diagram 1000 of an example process in the third user device 100C, to the create channel map 106C, which avoids interference represented in the advertised channel maps 106A and 106B, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 1002: receiving, by an apparatus, wireless device discovery messages from one or more other wireless devices in wireless networks not connected to the apparatus, one or more of the received wireless discovery messages including channel information indicating status of one or more channels;

Step 1004: creating, by the apparatus, a channel map that is at least partly based on the status of the one more channels indicated in the received one or more wireless device discovery messages; and Step 1006: selecting, by the apparatus, channels for setting up wireless communication with another wireless device, the channels being selected at least partly based on the channel map created by the apparatus.

FIG. 10B is an illustration of an example flow diagram 1020 of an example process in the third user device 100C, to retune channels from the second channel map 106C' for continued communication with sensor device 102C, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 1022: receiving, by the apparatus, second wireless device discovery messages from the one or more other wireless devices in the wireless networks not connected to the apparatus, one or more of the received wireless discovery messages including channel information indicating a change in status of one or more channels;

Step 1024: creating, by the apparatus, a second channel map that is at least partly based on the change in status of the one more channels; and Step 1026: tuning, by the apparatus, channels for continued communication over an existing wireless connection with the another wireless device, the channels being tuned based on the second channel map created by the apparatus.

FIG. 11 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   receiving, by an apparatus, wireless device Bluetooth Low Energy advertising discovery messages broadcast from one or more other wireless devices in wireless networks not connected to the apparatus, one or more of the received wireless discovery messages including channel information indicating status of one or more channels;
   creating, by the apparatus, a channel map that is at least partly based on the status of the one more channels indicated in the received one or more wireless device discovery messages;
   selecting, by the apparatus, channels for setting up wireless communication with another wireless device, the channels being selected at least partly based on the channel map created by the apparatus;
   compiling, by the apparatus, a Bluetooth Low Energy advertising discovery message including information of the channel map incorporated into one or more fields in the advertising packet; and
   transmitting, by the apparatus, one or more of the compiled Bluetooth Low Energy advertising discovery messages broadcast by the apparatus to other wireless devices in wireless networks not connected to the apparatus, one or more of the transmitted discovery messages including the information of the channel map created by the apparatus.

2. The method of claim 1, further comprising:
   receiving, by the apparatus, second wireless device discovery messages from the one or more other wireless devices in the wireless networks not connected to the apparatus, one or more of the received wireless discovery messages including channel information indicating a change in status of one or more channels;
   creating, by the apparatus, a second channel map that is at least partly based on the change in status of the one more channels; and
   tuning, by the apparatus, channels for continued communication over an existing wireless connection with the another wireless device, the channels being tuned based on the second channel map created by the apparatus.

3. The method of claim 1, wherein the channel information in the received wireless discovery message comprises at least one of a bit mask of used channels, a bit mask of used channels where a last several bits are used to indicate channel occupancy rate, or predefined used channel sets.

4. The method of claim 1, wherein the wireless device discovery messages received by the apparatus are Bluetooth Low Energy advertising messages and the channel information included in the advertising messages is a channel map indicating wireless channels in use by the one of the one or more other wireless devices that sent the received advertising messages, the channel map further indicating one or more wireless channels having interference.

5. The method of claim 1, wherein the creating, by the apparatus, of a channel map is performed by creating a new channel map of the apparatus using an LE Set Host Channel Classification Command, to specify a channel classification based on channels indicated in the received wireless device discovery messages.

6. An apparatus, comprising:
 at least one processor;
 at least one memory including computer program code;
 the at least one memory and the computer program code configured to, with the at least one processor, cause the apparatus at least to:
 receive wireless device Bluetooth Low Energy advertising discovery messages broadcast from one or more other wireless devices in wireless networks not connected to the apparatus, one or more of the received wireless discovery messages including channel information indicating status of one or more channels;
 create a channel map that is at least partly based on the status of the one more channels indicated in the received one or more wireless device discovery messages;
 select channels for setting up wireless communication with another wireless device, the channels being selected at least partly based on the channel map created by the apparatus;
 compile a Bluetooth Low Energy advertising discovery message including information of the channel map incorporated into one or more fields in the advertising packet; and
 transmit one or more of the compiled Bluetooth Low Energy advertising discovery messages broadcast by the apparatus to other wireless devices in wireless networks not connected to the apparatus, one or more of the transmitted discovery messages including the information of the channel map created by the apparatus.

7. The apparatus of claim 6, further comprising:
 the at least one memory and the computer program code configured to, with the at least one processor, cause the apparatus at least to:
 receive second wireless device discovery messages from the one or more other wireless devices in the wireless networks not connected to the apparatus, one or more of the received wireless discovery messages including channel information indicating a change in status of one or more channels;
 create a second channel map that is at least partly based on the change in status of the one more channels; and
 tune channels for continued communication over an existing wireless connection with the another wireless device, the channels being tuned based on the second channel map created by the apparatus.

8. The apparatus of claim 6, wherein the channel information in the received wireless discovery message comprises at least one of a bit mask of used channels, a bit mask of used channels where a last several bits are used to indicate channel occupancy rate, or predefined used channel sets.

9. The apparatus of claim 6, wherein the wireless device discovery messages received by the apparatus are Bluetooth Low Energy advertising messages and the channel information included in the advertising messages is a channel map indicating wireless channels in use by the one of the one or more other wireless devices that sent the received advertising messages, the channel map further indicating one or more wireless channels having interference.

10. The apparatus of claim 6, wherein the creating, by the apparatus, of a channel map is performed by creating a new channel map of the apparatus using an LE Set Host Channel Classification Command, to specify a channel classification based on channels indicated in the received wireless device discovery messages.

11. A computer program product comprising computer executable program code recorded on a computer readable, non-transitory storage medium, the computer executable program code comprising:
 code for receiving, by an apparatus, wireless device Bluetooth Low Energy advertising discovery messages broadcast from one or more other wireless devices in wireless networks not connected to the apparatus, one or more of the received wireless discovery messages including channel information indicating status of one or more channels;
 code for creating, by the apparatus, a channel map that is at least partly based on the status of the one more channels indicated in the received one or more wireless device discovery messages;
 code for selecting, by the apparatus, channels for setting up wireless communication with another wireless device, the channels being selected at least partly based on the channel map created by the apparatus;
 code for compiling, by the apparatus, a Bluetooth Low Energy advertising discovery message including information of the channel map incorporated into one or more fields in the advertising packet; and
 code for transmitting, by the apparatus, one or more of the compiled Bluetooth Low Energy advertising discovery messages broadcast by the apparatus to other wireless devices in wireless networks not connected to the apparatus, one or more of the transmitted discovery messages including the information of the channel map created by the apparatus.

12. A method, comprising:
 maintaining, by an apparatus, a channel map used for communication with another wireless device, the channel map indicating status of one or more channels;
 compiling, by the apparatus, a Bluetooth Low Energy advertising discovery message including information of the channel map incorporated into one or more fields in the advertising packet;
 transmitting, by the apparatus, one or more Bluetooth Low Energy advertising discovery messages broadcast by the apparatus to other wireless devices in wireless networks not connected to the apparatus, one or more of the transmitted discovery messages including the information of the channel map created by the apparatus; and
 selecting, by the apparatus, channels for setting up wireless communication with another wireless device, the channels being selected at least partly based on the channel map created by the apparatus.

13. The method of claim 12, wherein the channel information indicates channels that are unsuitable for use.

14. The method of claim 12, further comprising:
connecting, by the apparatus, with the another wireless device, using the channels selected by the apparatus, at least partly based on the channel map created by the apparatus.

15. The method of claim 14, further comprising:
generating, by the apparatus, a non-connectable discovery packet including the channel map created by the apparatus; and
communicating, by the apparatus, the non-connectable discovery packet while the apparatus is connected to the another wireless device.

16. The method of claim 12, wherein the channel information in the compiled wireless discovery message comprises at least one of a bit mask of used channels, a bit mask of used channels where a last several bits are used to indicate channel occupancy rate, or predefined used channel sets.

17. The method of claim 12, wherein the wireless device discovery messages compiled by the apparatus are Bluetooth Low Energy advertising messages and the channel information included in the advertising messages is a channel map indicating wireless channels in use by the apparatus, the channel map further indicating one or more wireless channels having interference.

18. An apparatus, comprising:
at least one processor;
at least one memory including computer program code;
the at least one memory and the computer program code configured to, with the at least one processor, cause the apparatus at least to:
maintain a channel map used for communication with another wireless device, the channel map indicating status of one or more channels;
compile a Bluetooth Low Energy advertising discovery message including information of the channel map incorporated into one or more fields in the advertising packet;
transmit one or more Bluetooth Low Energy advertising discovery messages broadcast by the apparatus to other wireless devices in wireless networks not connected to the apparatus, one or more of the transmitted discovery messages including the information of the channel map created by the apparatus; and
select channels for setting up wireless communication with another wireless device, the channels being selected at least partly based on the channel map created by the apparatus.

19. The apparatus of claim 18, wherein the channel information in the compiled wireless discovery message comprises at least one of a bit mask of used channels, a bit mask of used channels where a last several bits are used to indicate channel occupancy rate, or predefined used channel sets.

20. The apparatus of claim 18, wherein the wireless device discovery messages compiled by the apparatus are Bluetooth Low Energy advertising messages and the channel information included in the advertising messages is a channel map indicating wireless channels in use by the apparatus, the channel map further indicating one or more wireless channels having interference.

21. A computer program product comprising computer executable program code recorded on a computer readable, non-transitory storage medium, the computer executable program code comprising:
code for maintaining, by an apparatus, a channel map used for communication with another wireless device, the channel map indicating status of one or more channels;
code for compiling, by the apparatus, a Bluetooth Low Energy advertising discovery message including information of the channel map incorporated into one or more fields in the advertising packet;
code for transmitting, by the apparatus, one or more Bluetooth Low Energy advertising discovery messages broadcast by the apparatus to other wireless devices in wireless networks not connected to the apparatus, one or more of the transmitted discovery messages including the information of the channel map created by the apparatus; and
code for selecting, by the apparatus, channels for setting up wireless communication with another wireless device, the channels being selected at least partly based on the channel map created by the apparatus.

* * * * *